(12) United States Patent
Kalsi

(10) Patent No.: US 6,911,759 B2
(45) Date of Patent: Jun. 28, 2005

(54) STATOR COIL ASSEMBLY FOR SUPERCONDUCTING ROTATING MACHINES

(75) Inventor: Swarn S. Kalsi, Shrewsbury, MA (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 10/320,321

(22) Filed: Dec. 16, 2002

(65) Prior Publication Data

US 2004/0046474 A1 Mar. 11, 2004

Related U.S. Application Data

(63) Continuation of application No. 09/632,412, filed on Aug. 4, 2000, now abandoned.

(51) Int. Cl.[7] .............................................. H02K 3/28
(52) U.S. Cl. ...................... 310/208; 310/184; 310/195; 310/198
(58) Field of Search ............................... 310/180, 184, 310/201, 213, 208, 195, 198

(56) References Cited

U.S. PATENT DOCUMENTS

| | | | |
|---|---|---|---|
| 1,643,178 A | | 9/1927 | Savage |
| 2,846,657 A | * | 8/1958 | Horelick ..................... 336/180 |
| 2,921,207 A | * | 1/1960 | Fletcher ..................... 310/206 |
| 3,252,117 A | * | 5/1966 | Fischer ....................... 336/187 |
| 3,980,910 A | * | 9/1976 | Steinebronn et al. ......... 310/71 |
| 4,164,672 A | * | 8/1979 | Flick ........................... 310/54 |
| 4,278,905 A | | 7/1981 | Chari et al. |
| 4,292,558 A | | 9/1981 | Flick et al. |
| 4,308,476 A | * | 12/1981 | Schuler ....................... 310/45 |
| 4,330,726 A | | 5/1982 | Albright et al. |
| 4,427,907 A | | 1/1984 | Flick et al. |
| 4,554,731 A | * | 11/1985 | Borden ........................ 29/605 |
| 5,175,396 A | * | 12/1992 | Emery et al. ................. 174/36 |
| 5,323,079 A | * | 6/1994 | Nieves et al. ............... 310/213 |
| 5,525,583 A | | 6/1996 | Aized et al. |
| 5,668,090 A | * | 9/1997 | Kalsi .......................... 505/166 |

FOREIGN PATENT DOCUMENTS

| | | | |
|---|---|---|---|
| DE | 263833 | | 9/1927 |
| EP | 0978926 | | 12/1997 |
| EP | 0935261 A2 | | 2/2000 |
| GB | 1395152 | * | 5/1975 ............ H02K/3/28 |

OTHER PUBLICATIONS

Rosenberg, et al., "Electric Motor Repair," 1986, Hartcourt Brace, Third Edition, p. 14.

* cited by examiner

Primary Examiner—Burton Mullins
(74) Attorney, Agent, or Firm—Fish & Richardson P.C.

(57) ABSTRACT

A stator for use in a rotating machine includes a first conductor; and a second conductor wound, in-hand, over the first conductor and along a longitudinal axis of the stator. The second conductor is electrically isolated from the first conductor along the length of the first and second conductors. The multiple conductor in-hand winding construction allows multiple conductors to be combined to increase the overall current handling capability of the stator while substantially maintaining the "packing factor" (i.e., ratio of current-carrying conductor to overall conductor). The packing factor is substantially maintained because the amount of turn-to-turn insulation winding between typical conductors is very small.

13 Claims, 20 Drawing Sheets

STATOR COIL ASSEMBLY FOR SUPERCONDUCTING ROTATING MACHINES

RELATED APPLICATION

This application is a continuation application and claims the benefit of priority under 35 USC §120 of U.S. application Ser. No. 09/632,412, filed Aug. 4, 2000, now abandoned. The disclosure of the prior application is considered part of and is incorporated by reference in the disclosure of this application.

INCORPORATION BY REFERENCE

The following applications are hereby incorporated by referenced into the subject application as if set forth herein in full: (1) U.S. application Ser. No. 09/632,599, filed Aug. 4, 2000, entitled "Superconducting Synchronous Machine Field Winding Protection"; (2) U.S. application Ser. No. 09/632,776, filed Aug. 4, 2000, entitled "HTS Superconducting Rotating Machine"; (3) U.S. application Ser. No. 09/632,600, filed Aug. 4, 2000, entitled "Exciter For Superconducting Rotating Machinery"; (4) U.S. application Ser. No. 09/632,602, filed Aug. 4, 2000, entitled "Segmented Rotor Assembly For Superconducting Rotating Machines"; and (5) U.S. application Ser. No. 09/632,601, filed Aug. 4, 2000, entitled "Stator Support Assembly For Superconducting Rotating Machines".

TECHNICAL FIELD

This invention relates to the construction and operation of stators for use in superconducting motors.

BACKGROUND

Typical electric machines (e.g. motors and generators) include a rotor assembly that rotates relative to a surrounding stator assembly. The stator assembly typically is wound from copper, which is ductile and has a relatively high electrical conductivity. The copper wire or cable used to wind the stator typically includes an outer insulation layers so that when the copper conductor is wound over itself, individual turns are electrically isolated from each other. As the level of current flowing through the stator increase so does the amount of copper.

SUMMARY

The invention features a stator for use in a rotating machine having an in-land wound construction.

In a general aspect of the invention the stator includes a first electrical conductor; and a second conductor wound, in-hand, over the first conductor and along a longitudinal axis of the stator. The second conductor is electrically isolated from the first conductor along the length of the first and second conductors.

Another aspect of the invention features a method for constructing a stator for use in a rotating machine. The method includes winding, in hand, and along the longitudinal axis, a first electrical conductor over a second conductor, the second conductor electrically isolated from the first conductor along the length of the first and second conductors. Providing a stator having this construction has numerous advantages. For example, the in-hand winding construction allows multiple conductors to be combined to increase the overall current handling capability of the stator while substantially maintaining the "packing factor" (i.e., ratio of current-carrying conductor to overall conductor). The packing factor is substantially maintained because the amount of turn-to-turn insulation winding between typical conductors is reduced.

Embodiments of these aspects of the invention may include one or more of the following features. The first conductor has an end electrically connected to an end of the second conductor. The first conductor is wound over the second conductor along the axis in a first direction to form a first layer of the stator and, at an end region of the stator, the first conductor is wound over the second conductor along the axis in a second direction, opposite the first direction to form a second layer of the stator. In essence, this arrangement provides a wound in-hand layer construction.

In one embodiment, at the end region, the position of the first conductor and the second conductor are transposed. With this arrangement voltages induced in the circuits formed by the conductors are identical to a first order and any circulating currents between the circuits are minimized. Thus, overall looses in the stator are reduced.

These and other features and advantages of the invention will be apparent from the following description of a presently preferred embodiment and the claims.

DESCRIPTION OF DRAWINGS

Like reference symbols in the various drawings indicate like elements.

DETAILED DESCRIPTION

Figure 1:
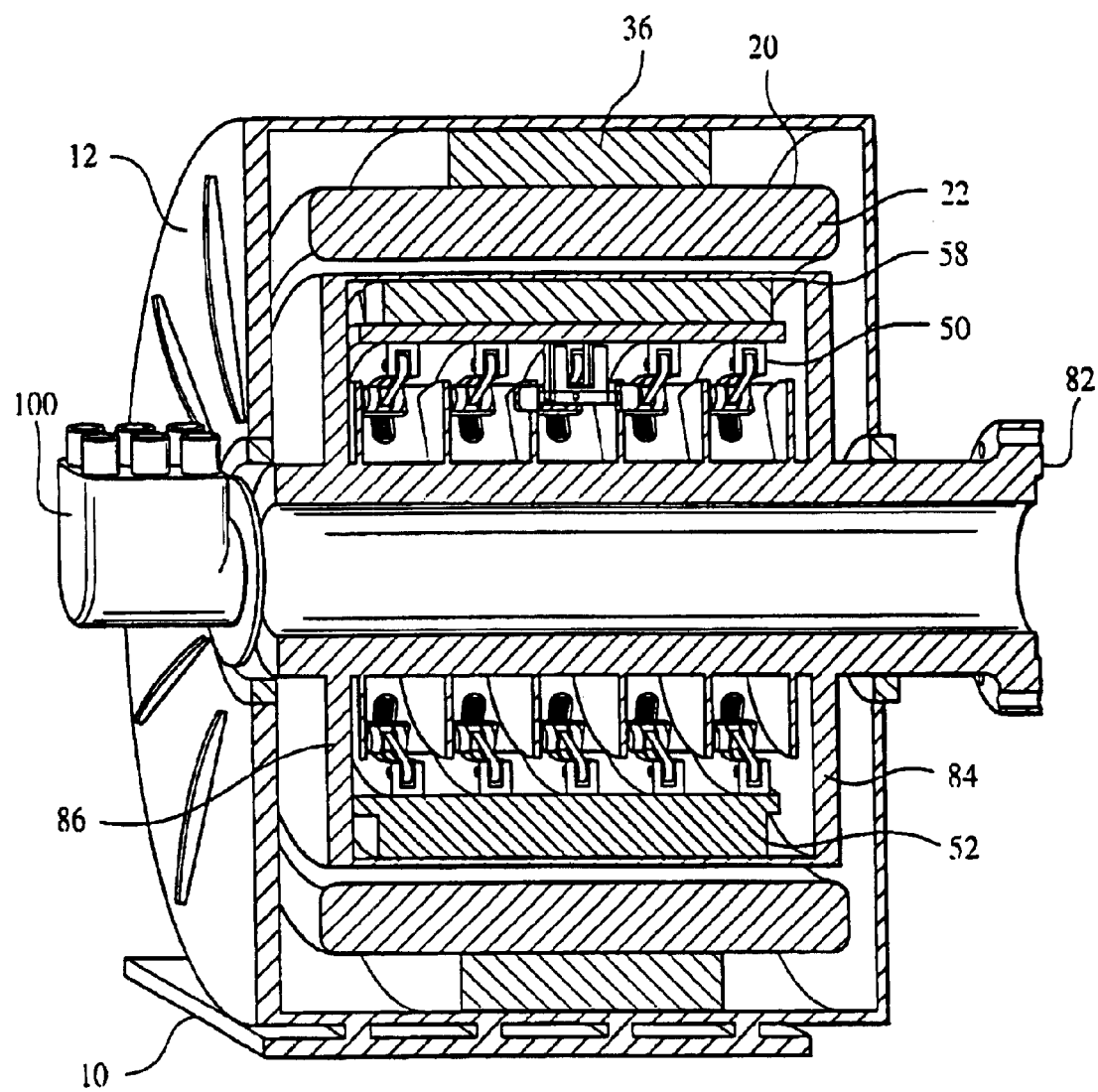
FIG. 1 is a cross-sectional perspective view of a superconducting motor in accordance with the invention.
Figure 2:
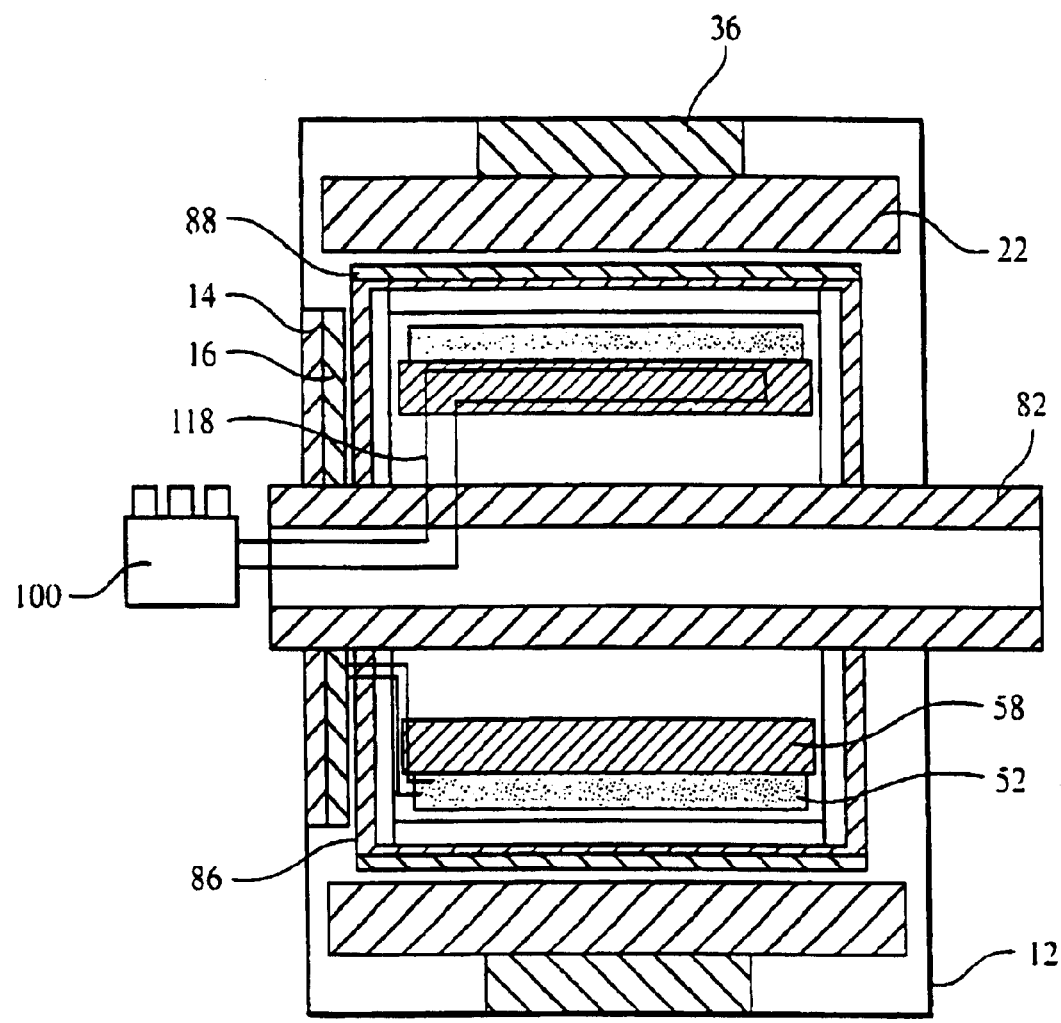
FIG. 2 is a generic cross-sectional view of the superconducting motor of FIG. 1.

Referring to FIGS. 1 and 2, a superconducting synchronous motor 10 includes a rotor assembly 50 cooled by a cryogenic cooling system 100, here a Gifford McMahon (GM) cooling system, and surrounded by a stator assembly 20. Both the stator assembly 20 and the rotor assembly 50 are mounted in a housing 12 to protect the components and any users of the superconducting motor 10 and to transmit motor torques to the mounting foundation. As will be described in greater detail below, each of these components and assemblies have features which contribute toward both increasing the overall performance, as well as reducing the overall size of motor 10. In particular, superconducting synchronous motor 10 can be shown to produce torque densities as high as 75 N·m/Kg or more at 500 RPM: or less. Furthermore, such motors are expected to provide a greatly improved gap shear stress characteristic in a range between 15 psi and 100 psi.

Referring to FIGS. 1 and 3–5, the stator assembly 20 includes, in this embodiment, one hundred eight stator coils 22 wound around a support tube 34, and arranged in a multi-phase configuration, here a 9-phase configuration. The twelve stator coils 22 per phase provide a 12-pole arrangement. A back iron 36 is constructed by wrapping magnetic wire around the stator coils 22. The stator coils 22 are wound into a diamond pattern, with one or more stator coil 22 diamond representing a single pole. The stator coils 22 are arranged around the support tube 34 by overlapping sides of adjoining stator coils 22 in the same phase.

Figure 6:
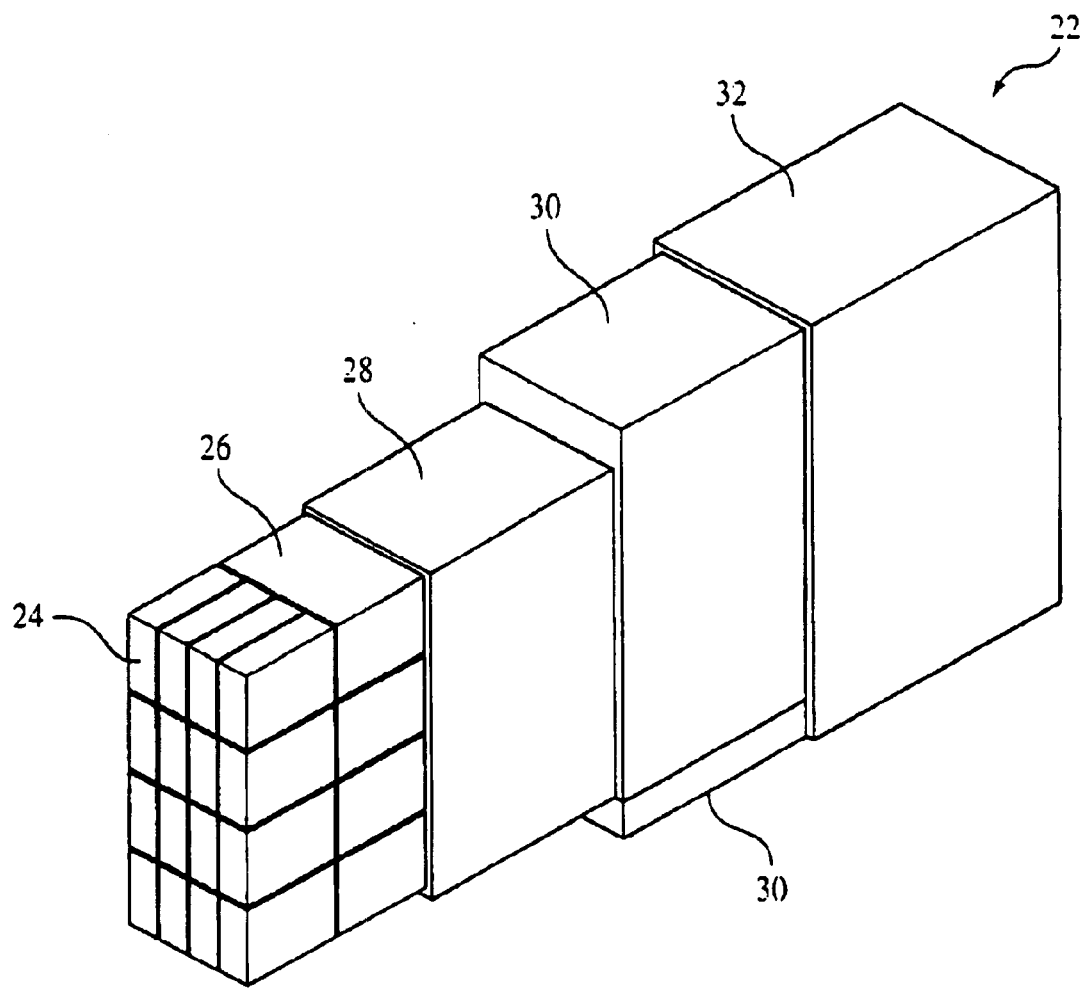
FIG. 6 is a cross-sectional perspective view of a stator coil section of the stator assembly of FIG. 3.

Referring to FIG. 6, cooling conduits 30 are positioned to be in thermal contact with each stator coil 22 to facilitate cooling of the stator assembly 20. Each cooling conduit 30 is constructed from a thin walled, high electrical resistivity alloy for minimizing eddy current heating. Each coolant passage of the cooling conduit 30 is distinct and electrically isolated from the adjacent coolant passage. Because the cooling conduits 30 are generally constructed from an electrically conductive material, an electrically insulating tape 28 is wrapped about the stator coil 22 to electrically insulate the stator coil 22 from surrounding components that are at ground potential, particularly the cooling conduits 30. In particular, the electrically insulating tape 28 maintains the cooling conduits 30 at ground potential, thereby permitting the use of fresh water, which contains ions. The electrically insulating tape 28 is made from a material having a thickness that can withstand operating voltages of the conductor turns 24, and can transport the heat generated by the conductor turns 24 to the cooling conduits 30. The thickness of the electrically insulating tape 28 is determined by the dielectric strength (insulating properties) of the material and operating voltage, typically between about 0.001 to 0.100 inches. Examples of materials for the electrically insulating tape 28 include, but are not limited to, epoxy, mica, and glass tapes.

In this embodiment, the stator coils 22 are formed of an array of multiple conductor turns 24. Each conductor turn 24 is electrically isolated from all adjacent turn by insulation 26. Insulation 26 may be formed of the same material as electrically insulating tape 28, but has a reduced thickness (e.g., 0.001 to 0.030 inches).

Figure 3:
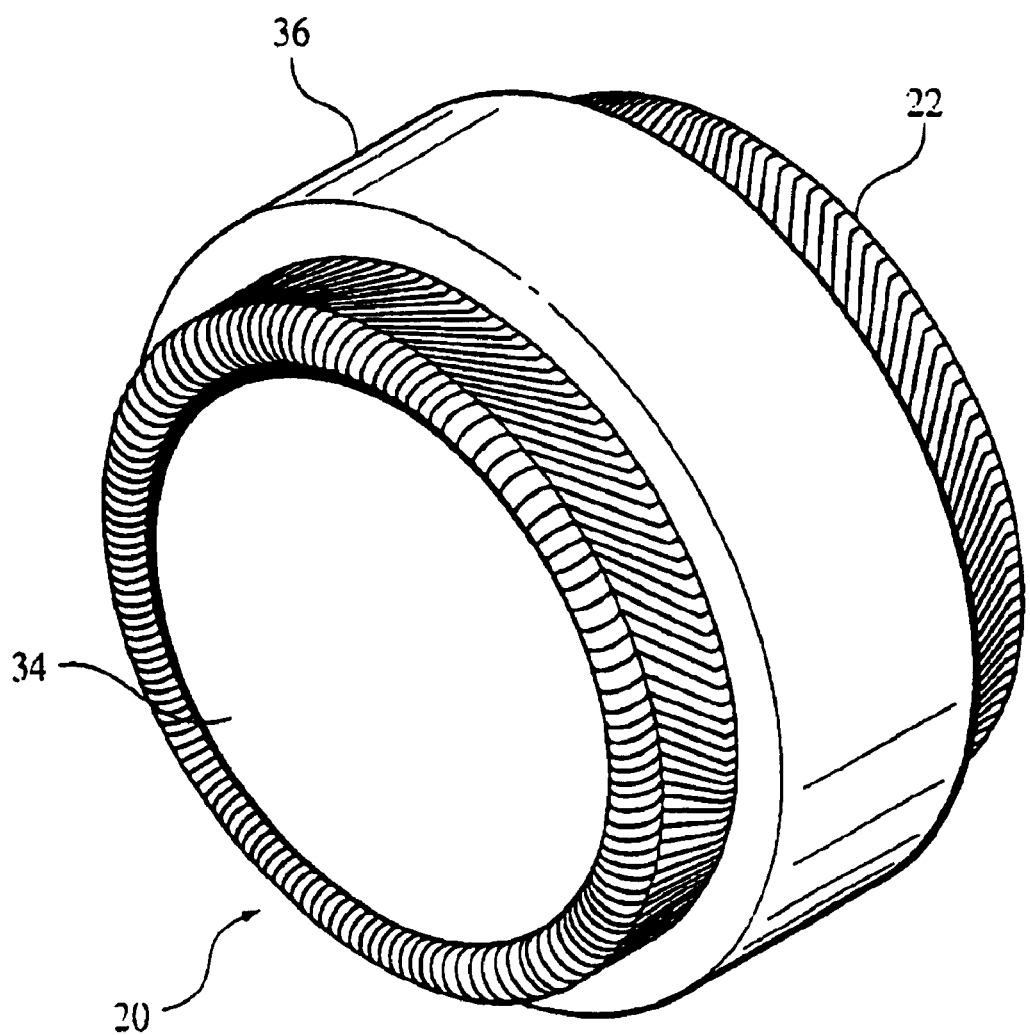
FIG. 3 is a perspective view of a stator assembly of the superconducting motor of FIG. 1.
Figure 4:
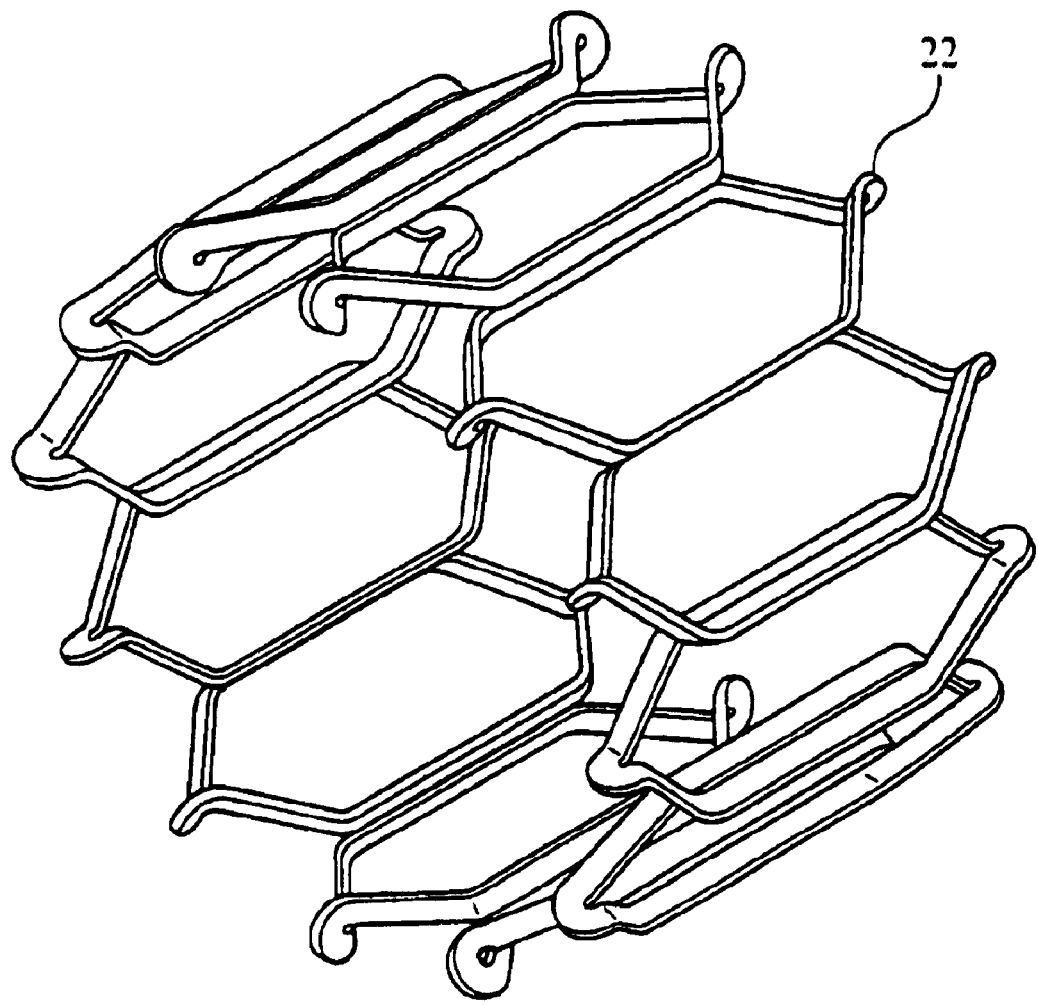
FIG. 4 is a perspective view of a single phase of stator coils of the stator assembly of FIG. 3.
Figure 5:
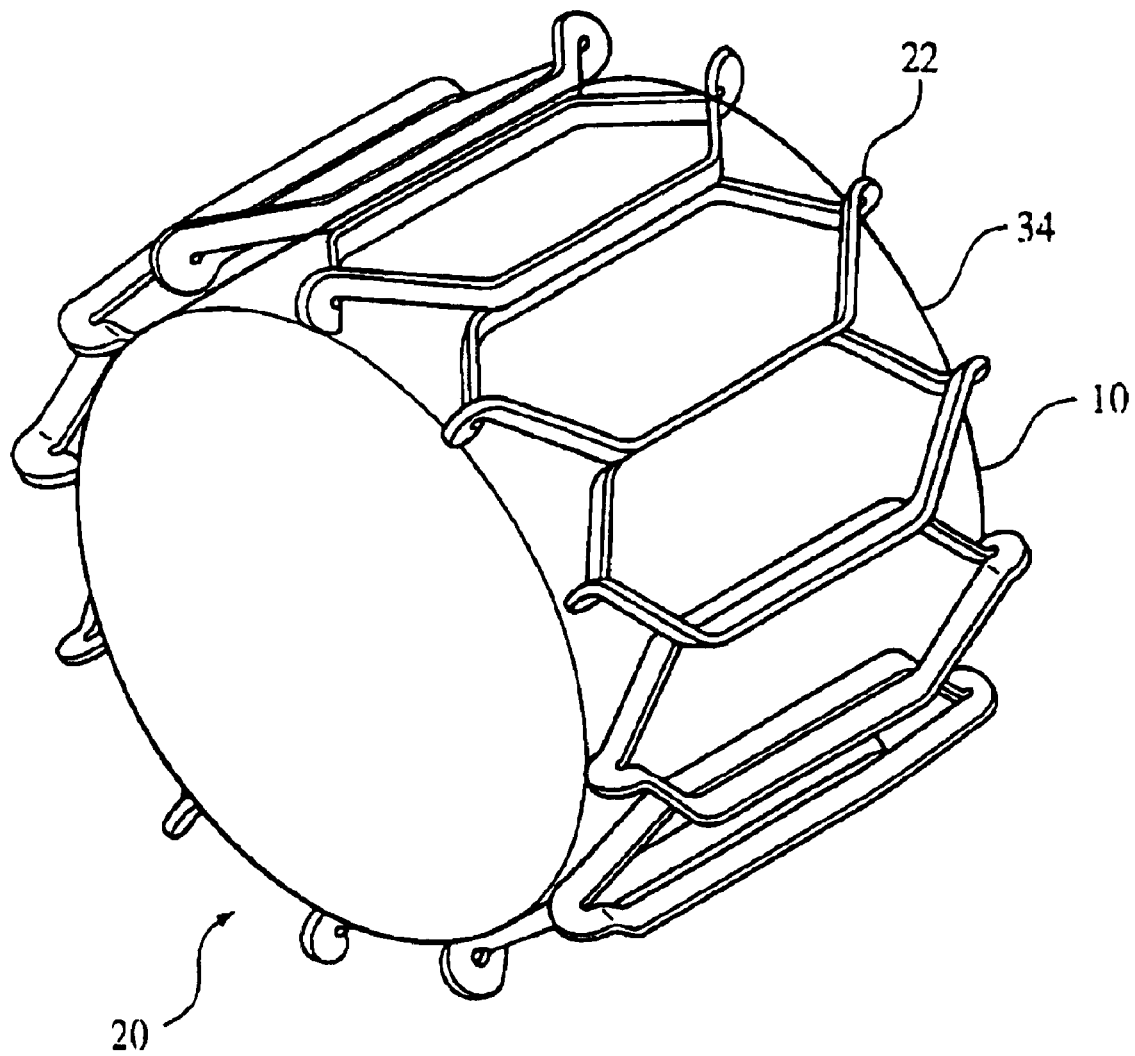
FIG. 5 is a perspective view of a single phase of stator coils mounted on the support tube of the stator assembly of FIG. 3.
Figure 6A:
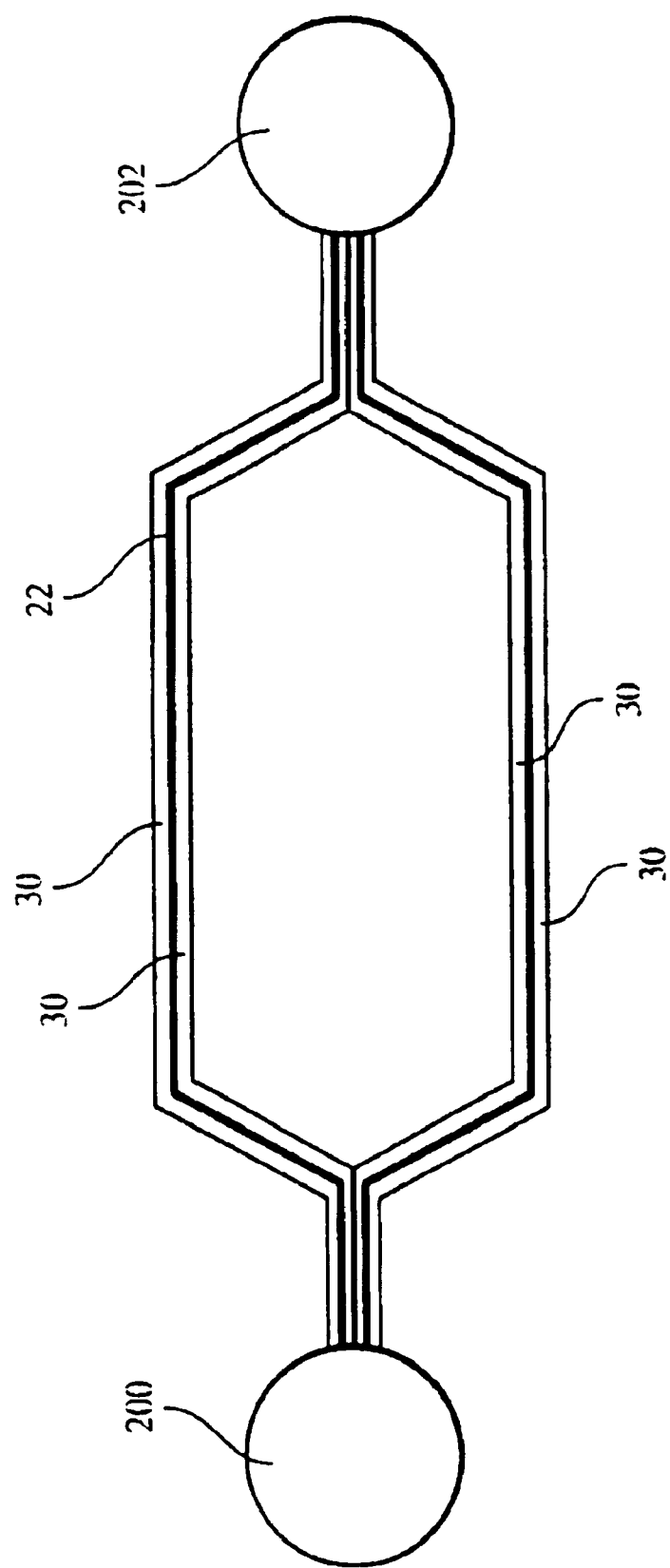
FIG. 6A is a schematic of two stator coils and an associated cooling loop.

Referring to FIGS. 6 and 6A, cooling conduits 30 are mounted adjacent to and in contact with the electrically insulating tape 28 surrounding each stator coil 22. Each cooling conduit 30 has a number of passages extending therethrough for receiving a coolant from a fresh water external source 200. With reference to FIG. 3, each cooling conduit 30 has an opening (not shown) at the end regions of each stator coil 22. Therefore, one hundred eight openings are in fluid communication with a manifold assembly (not shown) to allow fluid into each cooling conduit 30 from the external source 200. On the other side of the stator coils 22, one hundred eight openings are in fluid communication with a return 202. In one embodiment, the manifolds are end caps (not shown) circumferentially mounted to the front and back edge of the stator assembly 20.

A porous copper thermally conductive member 32, which has low electrical conductivity, is disposed about the stator coil 22 and cooling conduits 30 to facilitate cooling of the entire stator coil 22. In other embodiments, this could be constructed from a wire or an insulated braid disposed about the stator coil 22. Absent the thermally conductive member 32, the stator coil 22 would only be cooled at the contact point between the cooling conduit 30 and the electrically insulating tape 28. Because of this contact point cooling, a thermal gradient would be induced through the electrically insulating material 28. This thermal gradient creates thermal stresses between the cooling conduit 30 and the electrically insulating tape 28, which can cause premature failure in the stator assembly 20 due to electrical breakdown at this interface. Additionally, with high power density embodiments, the cooling conduit 30 cannot be mounted on a wide side of the stator coil 22 due to the required high packing densities. To minimize the peak temperature, the thermally conductive member 32 is positioned around the stator coil 22 and the cooling conduit 30 to allow heat transfer from the sides of the stator coil 22 that are not in direct contact with the cooling conduit 30.

In certain embodiments, cooling of the stator assembly 20 is further enhanced by varying the thickness of the electrically insulating material 28. The electrically insulating material 28 isolating the conductor turns 24 in each diamond-shaped stator coil 22 from the grounded thermally conductive member 32 experiences varying dielectric stress dependent on the electrical location of the coil within a given phase of the stator assembly 20 with stator coils 22 connected in series. The two stator coils 22 at the end of the phase are connected directly to line voltage and their electrically insulating material 28 experiences maximum dielectric stress between conductor turn 24 and the thermally conducting member 32. The coils electrically located midway between the ends of the phase are exposed to approximately half the dielectric stress due to the voltage drops in the stator coils 22 between the end and middle of the phase. The thickness of the electrically insulating material 28 is varied in uniform steps directly proportional to the voltage variation. In one embodiment, the minimum thickness of the electrically insulating material 28 thickness is calculated by the relationship $T_{ins}*(0.5+(1/N))$, where $T_{ins}$ represents the maximum thickness of the electrically insulating material 28 at coils connected to the line voltage and N represents the even number of stator coils 22 in each phase. The electrically insulating material 28 thickness will proportionally vary in uniform steps between the maximum thickness, $T_{ins}$, and the minimum thickness. Varying the thickness of the electrically insulating material 28 will help facilitate cooling, since thicker electrically insulating material 28 will not be used where it is not needed.

In another embodiment, the stator coils 22 in each phase may be arranged and connected in pairs in a two layer winding with stator coils 22 having the thinnest and thickest electrically insulating material 28 being paired. Stator coils 22 with the next thinnest and next thickest electrically insulating material 28 are then paired, this process being continued until the final two middle stator coils 22 are paired.

In certain other embodiments, the benefits of varying the thickness of the electrically insulating material 28 can be enhanced by varying the cross sectional area of each of the two stator coils 22 in the above described pairs of stator coils 22. The cross sectional area of the conducting turns 24 in the stator coil 22 with thin electrically insulating material can be decreased as higher power can be dissipated due to the decreased thermal resistance of the thin electrically insulating material 28. This makes room in the same coil pair to decrease the power dissipation in the remaining coil with thick electrically insulating material 28 by increasing the cross sectional area of its conducting turns 24. Typically winding temperature rise is reduced by 30 percent compared with the result of using conventional art with uniform insulation thickness and uniform wire cross sectional areas. Increased resistance to voltage breakdown between the conducting turns 24 and the adjacent thermally conductive member 32 can be obtained compared with conventional art by increasing the thickness of electrically insulating material 28 on each of the coils in the above coil pairs for the same higher temperature as obtained with conventional art.

In another embodiment, a flexible graphite tape is used to substitute for the porous copper thermally conductive member 32. The flexible graphite tape is wrapped around the stator coil 22 and cooling conduits 30 to facilitate cooling of the entire stator coil 22. As was the case with the thermally conductive member 32 described above in conjunction with FIG. 6, the flexible graphite tape serves to dissipate heat from the stator coil 22 in a similar way as copper while having more desirable electrical characteristics. Flexible graphite tape is available from UCAR Carbon Company, Inc., PO Box 94637, Cleveland, Ohio 44101, and sold under the trade name Grafoil®. Grafoil® was originally developed for high temperature gasketing applications and is described in U.S. Pat. No. 3,404,061. The thermal conductivity and electrical resistivity of such flexible graphite tapes are a function of its density. For example, one type of Grafoil tape has the following characteristics:

| Grafoil Density (lbs/ft$^3$) | Electricity Resistivity ($\mu\Omega$m) | Implied Thermal Conductivity (W/m° C.) |
| --- | --- | --- |
| 70 | 6.7 | 140 (measured) |
| 80 | 4.0 | 230 |
| 90 | 2.5 | 375 |

From the above data, we can see that a Grafoil® tape having a density characteristic of 90 lbs/ft$^3$ has a thermal conductivity characteristic of 375 W/m° C., comparable to copper (400 W/m° C.).

The advantages of using flexible graphite are numerous. Flexible graphite has a thermal conductivity characteristic comparable to copper, but has an electrical resistivity characteristic 100 times larger than copper at room temperature. Because of its high electrical resistivity, flexible graphite does not generate significant eddy-current heating in an AC field. In addition, flexible graphite has only 1% of the loss of a copper material of identical thickness in the same magnetic field. This loss is sufficiently low that it does not interrupt the electric current flowing through the flexible graphite. Other valuable characteristics of flexible graphite include being highly sealable over extended periods of time, permanently resilient, non-hardening and non-aging.

The flexible graphite tape is generally required to be applied under pressure. There are several approaches for bonding the flexible graphite tape to the stator coil 22. In one approach, after the flexible graphite tape is wrapped around the outer surface of the stator coil 22 and cooling conduits 30, a layer of glass tape (e.g. Kevlar®) is applied over the flexible graphite tape with high tension. The assembly is then epoxy impregnated. In another approach, the flexible graphite tape is first bonded to a glass tape with a thickness of 1–2 mil before wrapping.

Figure 7:
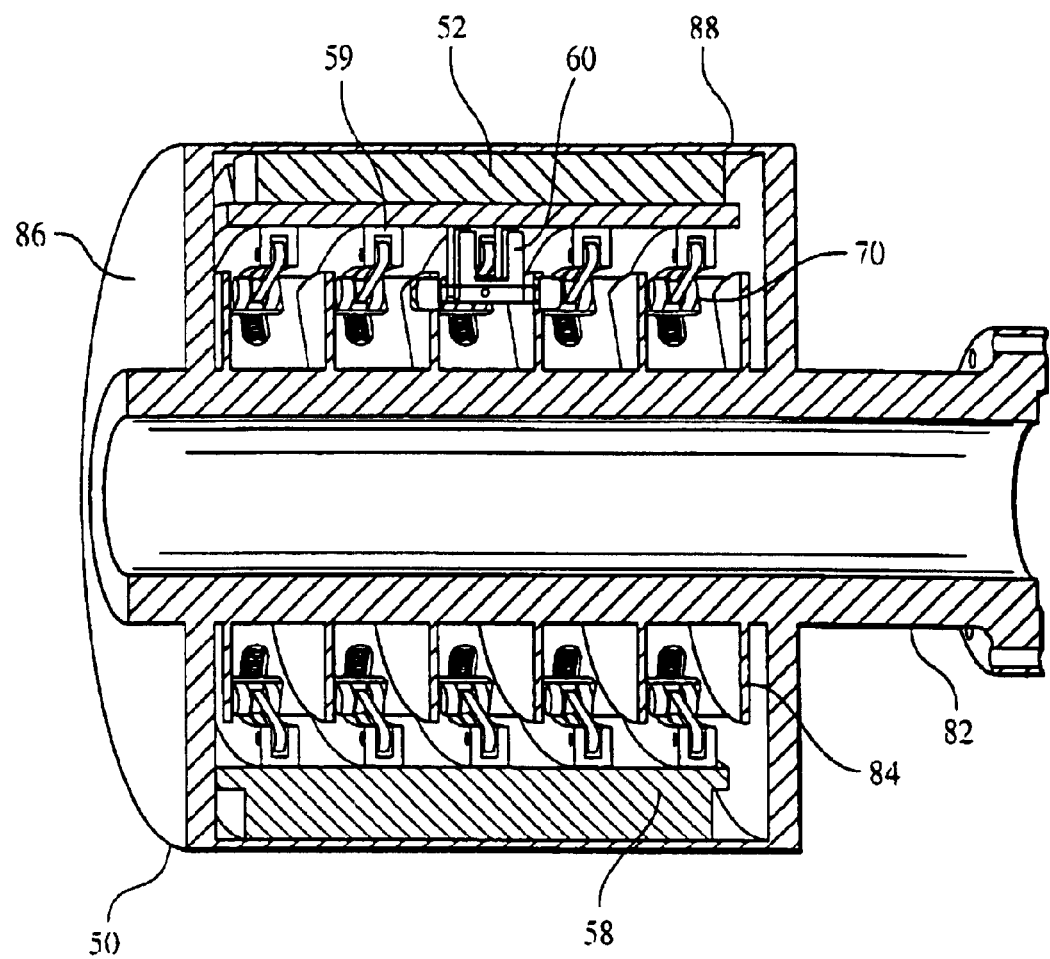
FIG. 7 is a cross-sectional perspective view of a rotor assembly of the superconducting motor of FIG. 1.

Referring to FIG. 7, the rotor assembly 50 includes a rotor body 58, onto which the superconducting rotor coils 52 are fixed, mounted onto an output shaft 82 by an array of tangential buckles 70 and axial buckles 60. As will be explained in detail below, the tangential buckles 70 and the axial buckles 60 transfer the torque and forces produced by the rotor coils 52 to the output shaft 82, while also thermally isolating the cryogenically cooled rotor body 58 from the output shaft 82. The tangential buckles 70 and axial buckles 60 are mounted between rotor body ribs 59 and output shaft plates 84, as will be described in detail below. Vacuum chamber walls 86 are integrally mounted to the output shaft 82, enclosing the rotor assembly 50 and acting as a cryostat. As will be described in detail below, a closed cryogenic cooling loop 118 (Shown in FIG. 2) is used to conduct heat from the rotor coils 52 to the cryocooler 104 where the heat can be dissipated. In particular embodiments, vacuum chamber 86 includes an outer cylindrical wall that, for reasons discussed below, serves as an electromagnetic shield 88.

Figure 8:
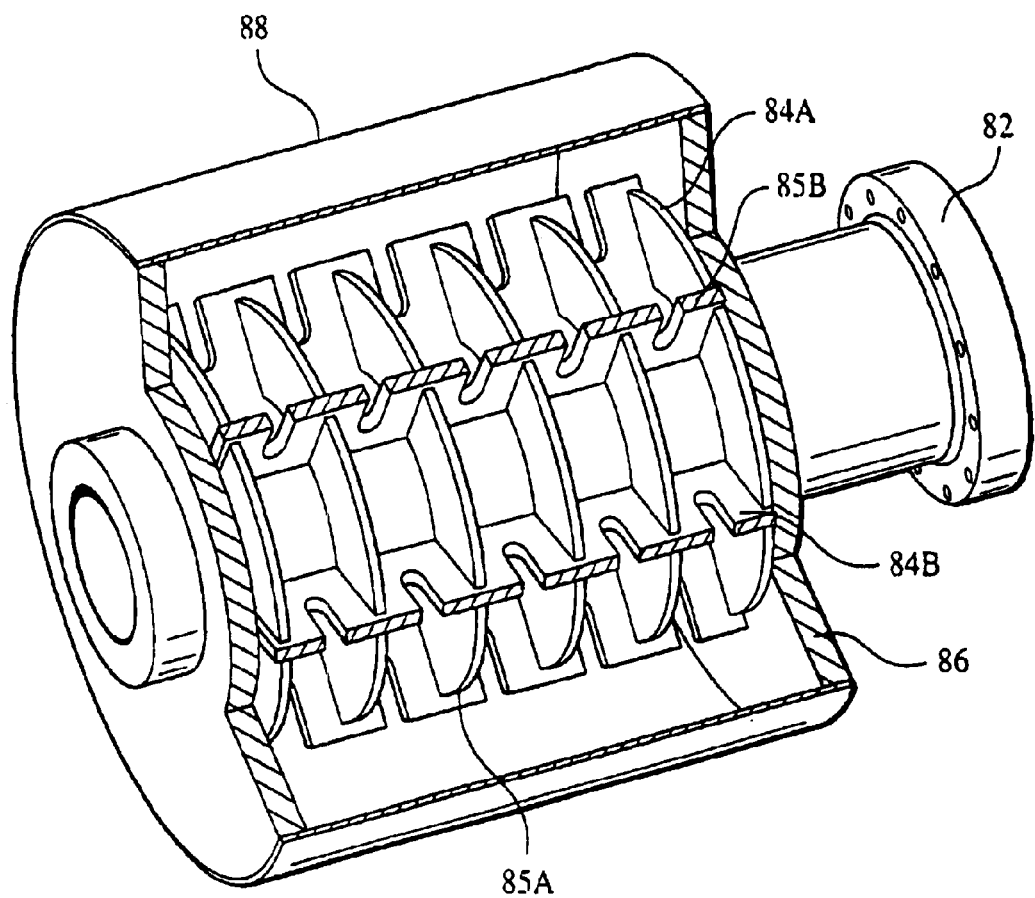
FIG. 8 is a cross-sectional perspective view of an output shaft and vacuum chamber of the rotor assembly of FIG. 7.

Referring to FIGS. 7 and 8, the output shaft 82 includes multiple plates 84 extending radially outward from the output shaft 82 surface. The multiple plates 84 include a first set of circumferentially extending plates 84A positioned around the output shaft 82 and a second set of longitudinally extending plates 84B positioned along the output shaft 82. Walls of the plates 84 form generally rectangular pockets, here thirty in number, around the surface of the output shaft 82 into which the tangential buckles 70 and axial buckles 60 mount. The plates 84 also include radial slots. Specifically, longitudinal plates 84B include radial slots 85B in every rectangular pocket wall around the output shaft 82 formed by the longitudinal plates 84B for mounting the tangential buckles 70. Similarly, the circumferential plates 84A define radial slots 85A in every other rectangular pocket wall around the output shaft 82 formed by the circumferential plates 84A for mounting the axial buckles 60. However, the present embodiment only utilizes three axial buckles displaced within the rectangular pockets in the middle of the rectangular pocket array. That is, no radial slots 85A are found on the outer circumferential plates 84A.

Referring again to FIG. 2, as discussed above, a vacuum chamber 86 is integrally mounted to the output shaft 82 and encloses the rotor assembly 50. The vacuum chamber 86 also encloses the circumferential plates 84A and longitudinal plates 84B, and is sized to allow the rotor body 58 and rotor coils 52 to be mounted to the output shaft 82. The output shaft 82 extends beyond the vacuum chamber 86 and the plates 84 at both ends. On one end, the output shaft 82 extends to connect to an external load that the motor 10 will drive. At the other end, the output shaft 82 connects to a rotating half of a brushless exciter 16.

The brushless exciter, shown in FIG. 2, includes a rotating disk 6 spaced from a stationary disk 14 (e.g., spaced 1–4 mm). Rotating disk 16 is formed of a high permeability powder core or laminated material core (e.g., iron) and includes a pair of concentric grooves within which a pair of coil windings is disposed. Stationary disk 14 is similarly formed of a high permeability material and includes a pair of concentric grooves within which a pair of coil windings is disposed. In essence, this arrangement provides a transformer having a primary, which rotates relative to a secondary of the transformer (or vice versa). An important feature of this particular arrangement is that the flux linkage generated by stationary disk 14 and rotating disk 16 when stationary is the same as when the rotating disk rotates. This feature advantageously allows superconducting rotor coils 52 to be charged prior to rotating disk 16 rotating (i.e., before motor 10 operates). The structure and operation of the brushless exciter is described in U.S. patent application Ser. No. 09/480,430, entitled "Exciter and Electronic Regulator for Superconducting Rotating Machinery," filed on Jan. 11, 2000, assigned to American Superconductor Corporation, assignee of the present invention, and incorporated herein by reference.

The rotor assembly includes an electromagnetic shield 88 wrapped around the vacuum chamber 86, formed preferably from a non-magnetic material (e.g., aluminum, copper). In embodiments in which vacuum chamber 86 is formed of a different material, such as stainless steel, electromagnetic shield 88 can be mechanically located around the outer wall of the vacuum chamber 86. Electromagnetic shield 88 also acts as an induction structure (i.e., supports induction Currents) and is, therefore, multi-purposed. Specifically, electromagnetic shield 88 intercepts AC magnetic fields from the stator before they impact the superconducting windings 26 of the rotor assembly 12. Further, because electromagnetic shield 60 acts as an induction structure, it can be used to operate the synchronous superconducting motor 10 at start-up in an induction mode. The electromagnetic shield 88 allows the superconducting motor 10 to operate as an induction motor for start up or in a continuous mode as a backup mode in case of a catastrophic failure of the cryogenic systems. This mode of operating a synchronous motor is described in U.S. patent application Ser. No. 09/371,692, which is assigned to American Superconductor Corporation, assignee of the present invention, and incorporated herein by reference.

Figure 9:
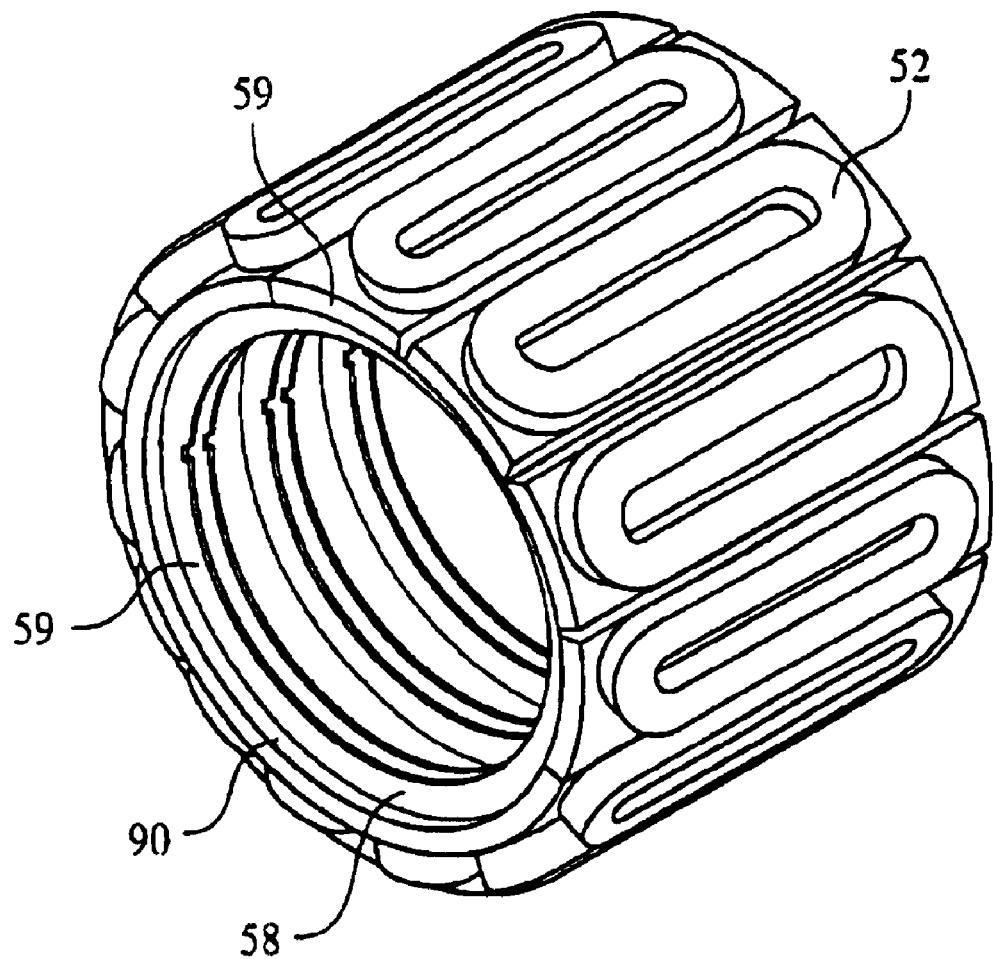
FIG. 9 is a perspective view of rotor coils mounted on a rotor body of the rotor assembly of FIG. 7.

Referring to FIG. 9, the rotor assembly 50 further includes superconducting rotor coils 52 mounted to a stainless steel rotor body 58 for support. The rotor body 58 also carries the closed cryogenic cooling loop 118 that cools the rotor coils 52. The rotor body 58 is tubular with an inner surface 90 and an outer surface 92. The outer surface 92 may be generally cylindrical in shape, or may have flats machined to accept the rotor coils 52. The machined flats may, for example, give the outer surface 92 a general pentagonal, hexagonal or heptagonal shape. In the present invention, twelve flats have been machined to accept twelve flat rotor coils 52.

The rotor body 58 includes rotor body ribs 59 to mount the tangential buckles 70 and axial buckles 60, which interface with the output shaft 82. The rotor body ribs 59 are circumferentially fixed on the inner surface 90 and extend radially inward from the inner surface 90 of the rotor body 58.

In this embodiment, the superconductor in the rotor coils 52 is a high temperature copper oxide ceramic superconducting material, such as $Bi_2Sr_2Ca_2Cu_3O_x$ or $(BiPb)_2$, commonly designated BSCCO 2223 or BSCCO (2.1)223. Other high temperature superconductors including YBCO (or superconductors where a rare earth element is substituted for the yttrium), TBCCO (i.e., thallium-barium-calcium-copper-oxide family), and HgBCCO (i.e., mercury-barium-calcium-copper-oxide family) are also within the scope of the invention. Rotor coils 52 may be formed with pancake coils either single or double layers. In certain embodiments, double pancake coils with the two coils of a pair being wound from the same continuous length of superconducting tape may be used. In this case, a pancake coil may include a diameter smaller than its associated pancake coil of the double pancake. An approach for using this approach is described in U.S. Pat. No. 5,581,220, which is assigned to American Superconductor, the assignee of the present invention, and incorporated herein by reference. Preferred embodiments are based on the magnetic and thermal properties of high temperature superconducting composites, preferably including superconducting ceramic oxides and most preferably those of the copper oxide family. Tile structure and operation of the superconducting windings is described in U.S. patent application Ser. No. 09/415,626, entitled "Superconducting Rotating Machine," filed on Oct. 12, 1999, assigned to American Superconductor Corporation, assignee of the present invention, and incorporated herein by reference.

Figure 10:
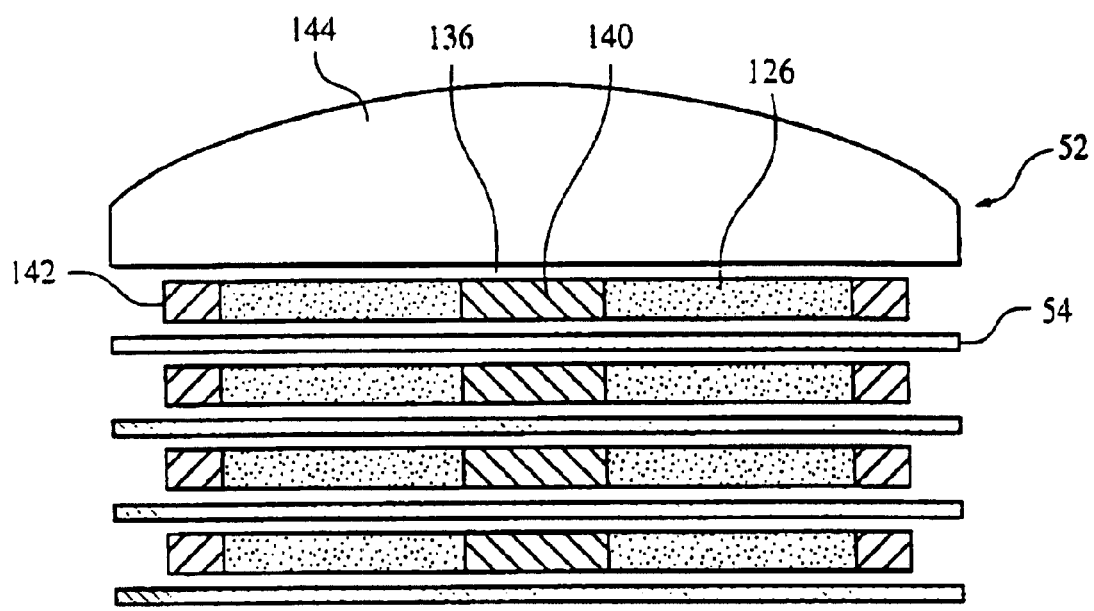
FIG. 10 is a cross-sectional view of the rotor coil stack with internal support members of the rotor coils of FIG. 9.

Referring to FIG. 10, the rotor coils 52, as described above, are fabricated with an internal support 54 to help stabilize the structure because the racetrack configuration produces tremendous bending stresses that attempt to push the superconducting coil assembly apart. To overcome this limitation, the rotor coils 52 are fabricated in a laminated configuration with internal coil supports 54, alternating between superconducting windings 126 and internal support 54. External supports, such as the inner spacer 140 and the outer spacer 142, do not sufficiently alleviate the internal stresses associated with non-circular and non-linear configurations, such as the racetrack configuration. The addition of internal coil supports 54 combined with the inner spacer 140 and outer spacer 142 gives mechanical strength to the rotor coil 52 and reduces the internal strains in the superconducting coils 126. The internal strains are reduced by using the internal coil supports 54 partly because the peak strains are located at the inside diameter of the superconducting coils 126, far removed from any external support structures that could be employed.

In the present embodiment, the internal coil support 54 is 40-mil thick stainless steel. However, it can be appreciated that various thicknesses and materials (such as copper or fiberglass composites) would work for their intended purposes, as various embodiments would require different thicknesses to optimize performance. In certain embodiments, a thermally conductive coating can be applied to the internal coil support 54 to provide better heat conductivity to cryogenic cooling tubes 118 located within the rotor body 58. For example, the internal coil support can be coated with copper.

A fastener can be used to tie the internal coil supports 54 together. For example, the layers can be mechanically fastened together by passing a bolt, or multiple bolts, through the internal coil supports 54 at a point within the annular opening 136 created by the superconductor windings 126 and fixing the assembly and top cap 144 to the rotor body 58.

The bolts tie the internal coil supports 54 together into a unitary whole, resulting in even greater mechanical strength. The rotor coils 52 can also be epoxied together, with or without fasteners, to further fix the lamination together.

The internal coil support member 54 will also have various openings (not shown) to facilitate electrical connections between adjacent superconductor windings. Each superconducting coil assembly in the rotor coils 52 has to be electrically connected. Since the internal support members 54 are placed between each rotor coil 52, an opening must be provided to allow the electrical connection between each rotor coil 52.

Figure 11:
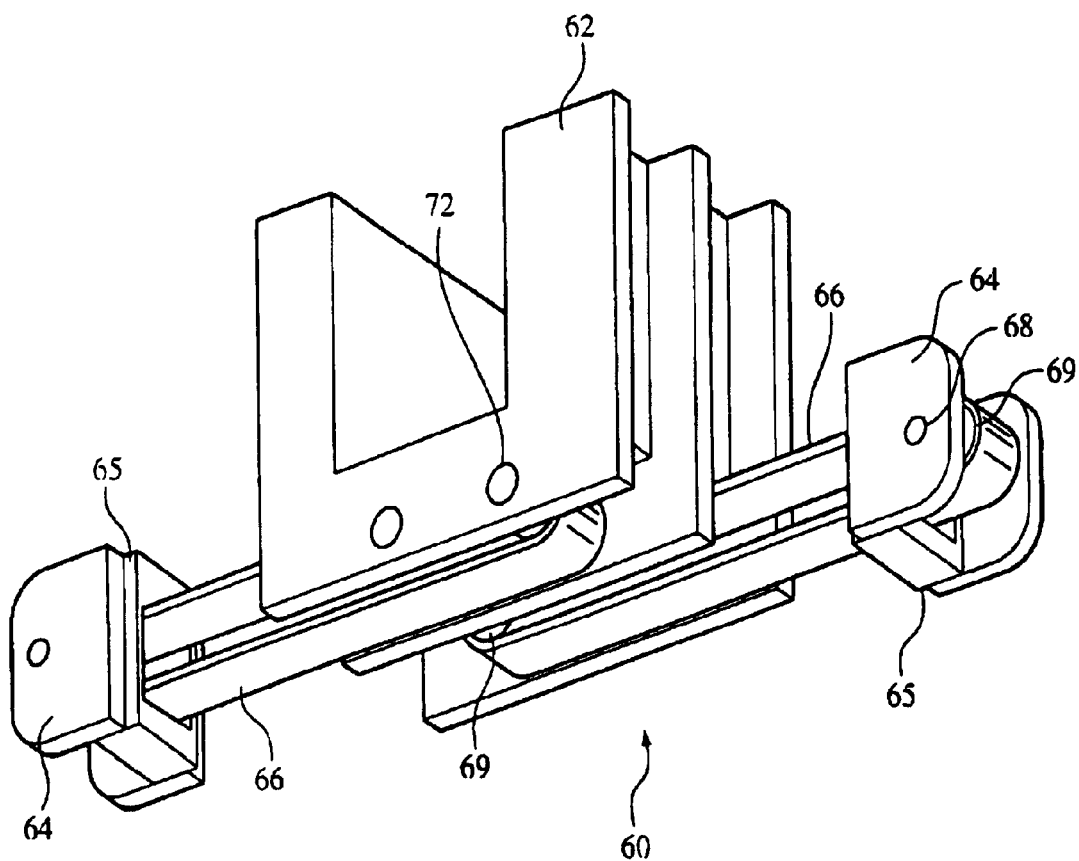
FIG. 11 is a perspective view of an axial buckle of the rotor assembly of FIG. 7.
Figure 13A:
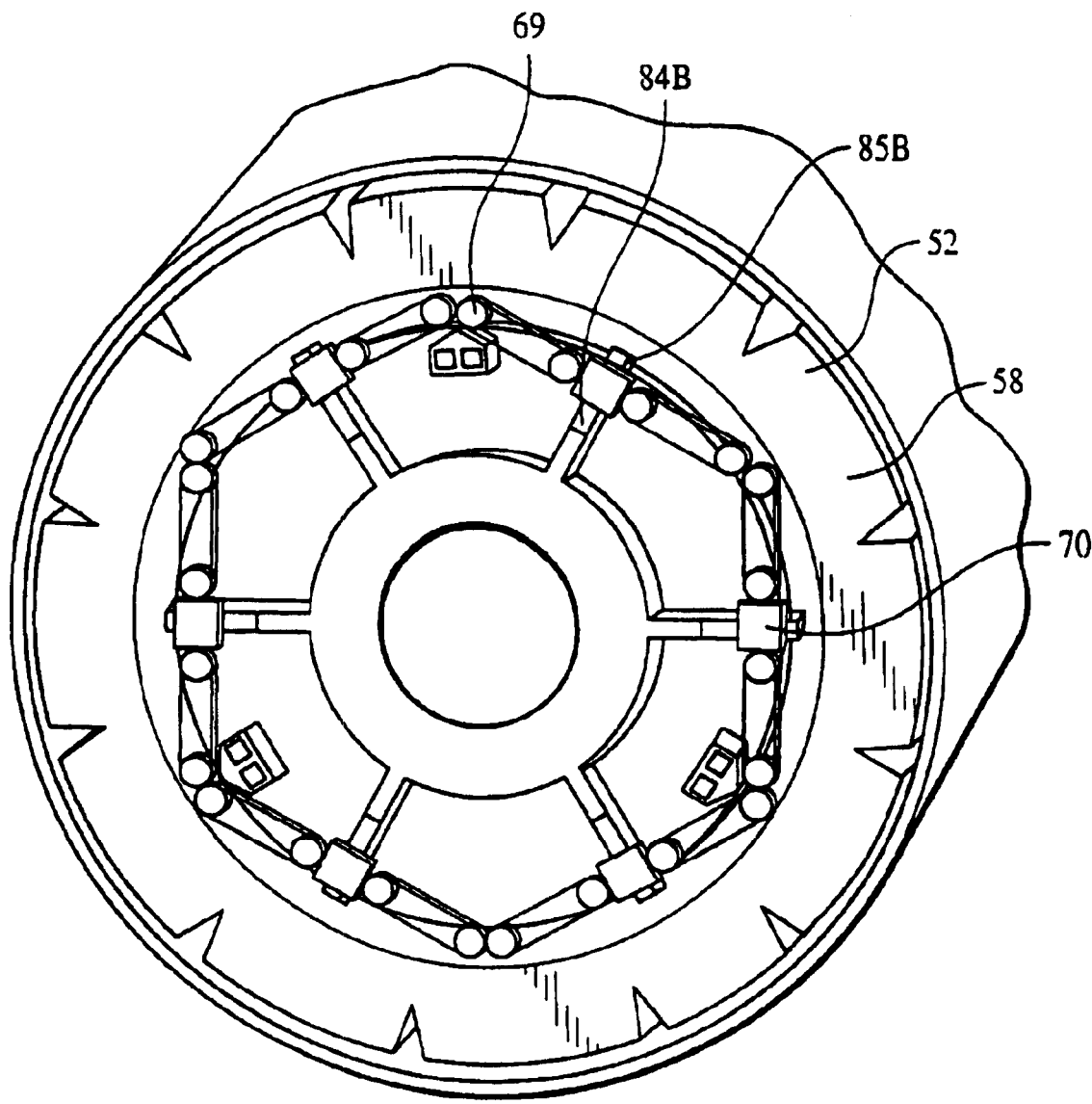
FIG. 13A is a cross-sectional perspective view of the tangential buckles mounted within the rotor assembly of FIG. 7.
Figure 13B:
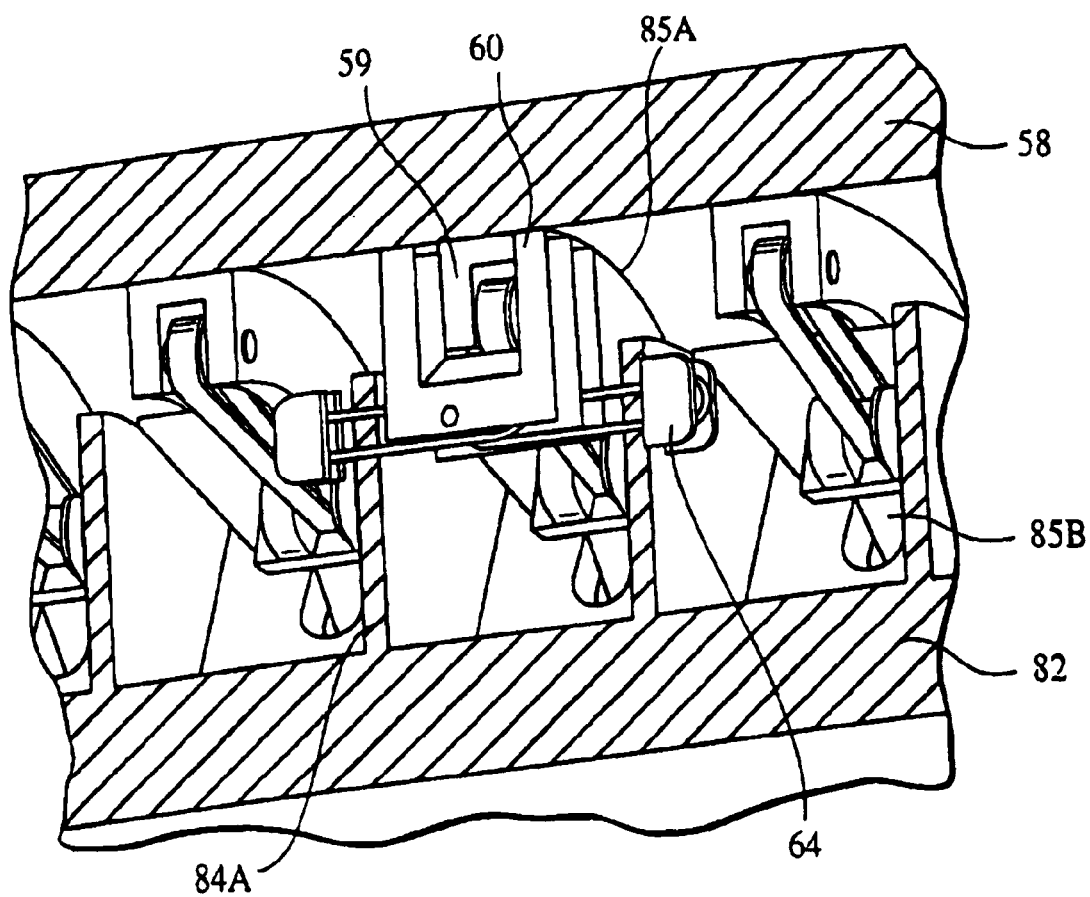
FIG. 13B is a cross-sectional perspective view of the axial buckles mounted within the rotor assembly of FIG. 7.

Referring to FIGS. 11 and 13B, the axial buckles 60 are assembled in the rotor assembly 50 to prevent axial movement between the rotor body 58 and the output shaft 82. The axial buckles 60 also thermally isolate the cryogenically cooled rotor body 58 from the output shaft 82 by using a thermally isolating coupling band 66 between the coupling members 62 and 64.

A generally U-shaped coupling member 62 is mounted to the rotor body 58 by sliding the open end over the rotor body rib 59. The rotor body rib 59 constrains the U-shaped coupling member 62 in the axial direction. Two smaller coupling members 64 are mounted in opposing radial slots 85A in the circumferential output shaft plates 84A by a narrow shoulder 65 on one face of the smaller coupling members 64. The narrow shoulder 65 slides into the radial slot 85A while the rest of the smaller coupling member 64 is wider than the radial slot 85A, thereby preventing the smaller coupling member 64 from moving beyond the slot 85A. The two smaller coupling members 64 are mechanically coupled to the U-shaped coupling member 62 by thermally isolating coupling bands 66. The thermally isolating coupling bands 66 are formed as straps made of reinforcing epoxy (e.g., Para-aramid epoxy). By using thermally isolating coupling bands 66, the output shaft 82 and the rotor body 58 are thermally isolated from each other since the coupling bands 66 are the only direct connection between the U-shaped coupling member 62 and the smaller coupling members 64. This thermal isolation helps prevent the output shaft 82 from acting as a heat sink.

The coupling bands 66 wrap around spherical ball end couplings 69 mounted in the U-shaped coupling member 62 and the smaller coupling members 64. The spherical ball end coupling 69 in one of the smaller coupling members is a cam 68, which is used to preload the coupling bands 66. Surrounding the cylindrical pins 72 and cam 68 are spherical ball ends 69. The spherical ball end couplings 69 hold the coupling band 66 and provide misalignment take-up. The spherical ball end couplings 69 maintain even loading to the coupling band 66. The coupling bands 66 are preloaded by turning the cam 68 to vary the tension. The coupling bands 66 are 180° apart, which allows one cam to tension both coupling bands 66 at the same time and put both coupling bands 66 in uniaxial tension. This configuration also constrains the rotor body 58 and output shaft 82 in both axial directions. The adjustability of the cam 68 allows each axial buckle 60 to be quickly preloaded by adjusting to any manufacturing tolerance differentiation for example within the coupling bands 66, thereby facilitating a quicker build time for the rotor assembly 50.

Figure 12A:
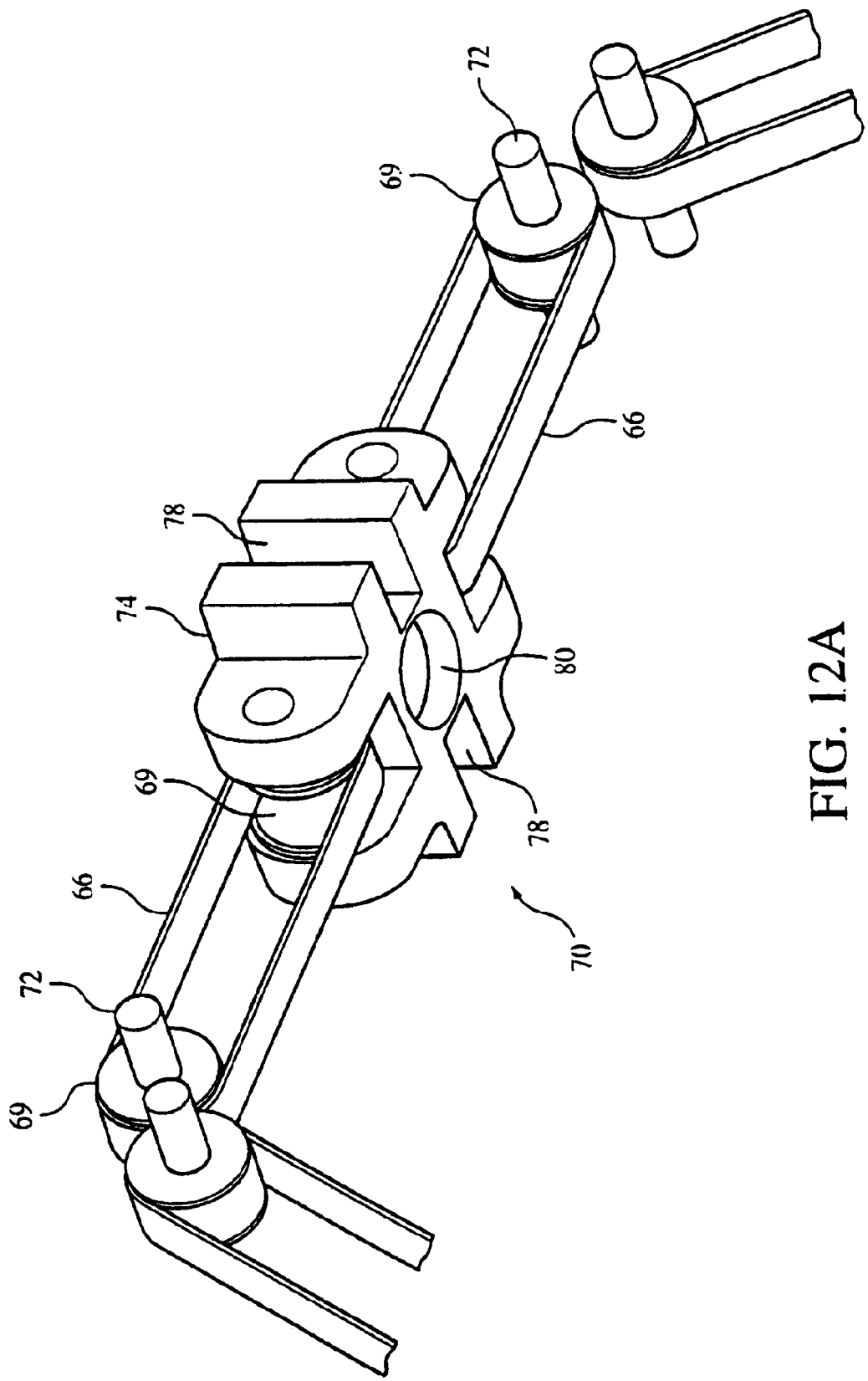
FIG. 12A is a perspective view of a tangential buckle of the rotor assembly of FIG. 7.

Referring to FIGS. 12A and 13A, the tangential buckles 70 are assembled in the rotor assembly 50 to transfer the rotational forces between the rotor body 58 and the output shaft 82. The tangential buckles 70 also thermally isolate the cryogenically cooled rotor body 58 from the output shaft 82 by using a thermally isolating coupling band 66 between the coupling members 72 and 74.

An X-shaped coupling member 74 is mounted to the output shaft 82 by two recessed slide mounting areas 78 located on opposing legs of the X-shaped coupling member 74. These recessed slide mount areas 78 are positioned such that the X-shape coupling member 74 mounts parallel to the axis of the output shaft 82. The recessed slide mounting areas 78 slide down into the radial slot 85B in the longitudinal plates 84B, which constrain the X-shaped coupling 74 in the circumferential and axial directions. Two spherical ball end coupling 69 are mounted between the rotor body ribs 59 by pressing a cylindrical pin 72 through the rotor body ribs 59 and a spherical ball end coupling 69. The spherical ball end couplings 69 are mechanically coupled to the X-shaped coupling member 74 by thermally isolating coupling bands 66. As discussed above, the thermally isolating coupling bands are Para-aramid/Epoxy straps, which thermally isolate the rotor body 58 form the output shaft 82.

Figure 12B:
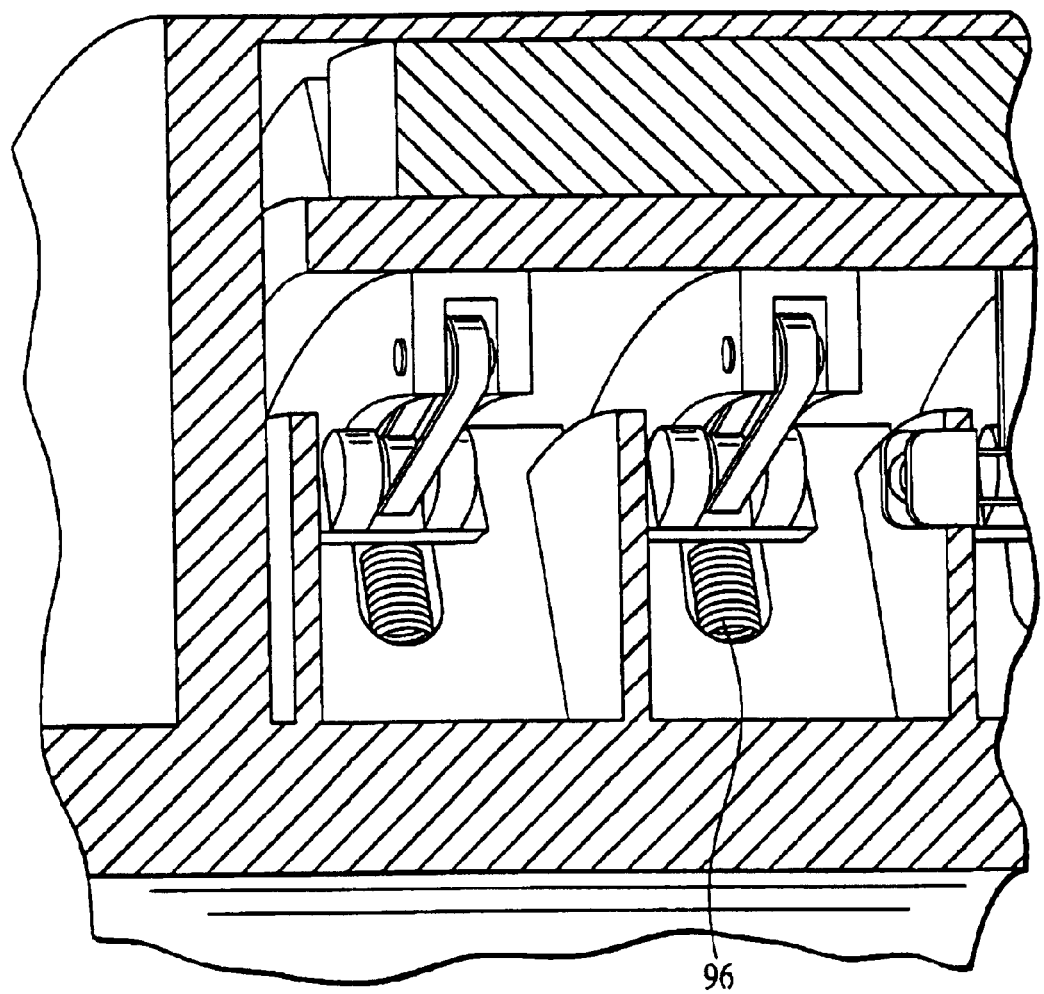
FIG. 12B is a perspective view of the tangential buckle of FIG. 12 mounted with a spring.

Referring to FIGS. 12A and 12B, the coupling bands 66 wrap around spherical ball end couplings 69 mounted in the X-shaped coupling member 74, in the two legs not defining the recessed slide mounting area 78, and around the spherical ball end coupling 69 mounted in the rotor body ribs 59. The coupling bands 66 are mounted 180° apart, which allows both coupling bands to be in uniaxial tension. The X-shaped coupling member 74 defines an opening 80 therethrough sized to accept a spring 96, which preloads both bands in uniaxial tension. The opening 80 is defined so as to be perpendicular to the axis of the output shaft 82 when the X-shaped coupling member 74 is mounted to the output shaft 82, allowing the spring 96 to push the X-shaped coupling member 74 radially outward. The spring 96 allows the tangential buckle 70 to be preloaded by compressing the spring 96. The spring 96 also allows for some compliance when the tangential buckle 70 is assembled within the rotor assembly 50. The compressed spring 96 allows each tangential buckle 70 to be quickly preloaded by adjusting to any manufacturing tolerance differentiation for example within the coupling bands 66, thereby facilitating a quicker build time for the rotor assembly 50. The preload feature also facilitates loading the coupling bands 66 in pure tension. By loading the coupling bands 66 in pure tension, the assembly can transmit an extremely large torque between the rotor body 58 and the output shaft 82.

The longitudinal output shaft plates 84B are sized within axial slots (FIG. 13A) in the rotor body 58 such that they will bottom out during a high fault loading situation, thereby preventing the coupling bands 66 from breaking. If a sudden shock load is applied to the motor 10, metal-to-metal contact will occur. The advantage to designing such a shock system is that the coupling bands 66 do not have to be sized for fault and shock loads, which would make the coupling bands 66 less practical.

Figure 14:
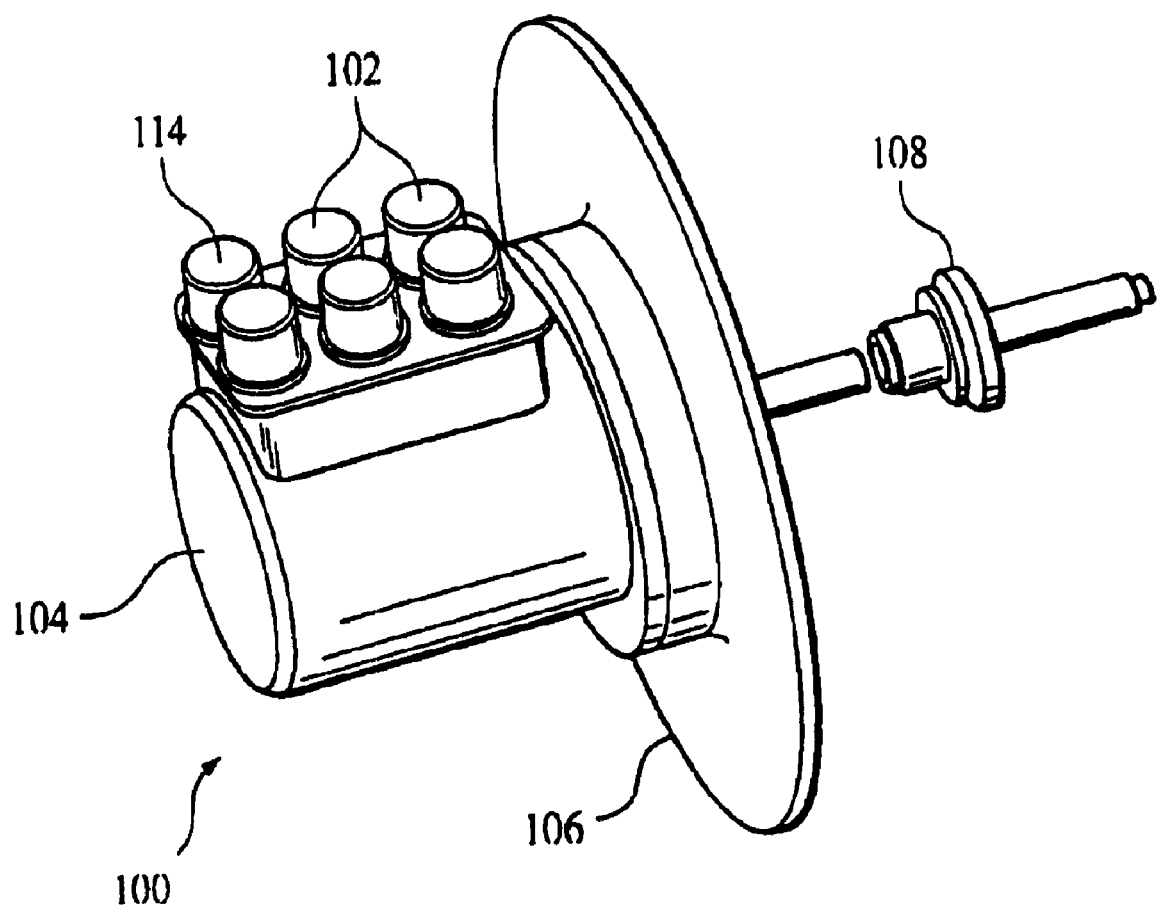
FIG. 14 is a perspective view of a cryogenic cooling system and mounting flange of the superconducting motor of FIG. 1.
Figure 15:
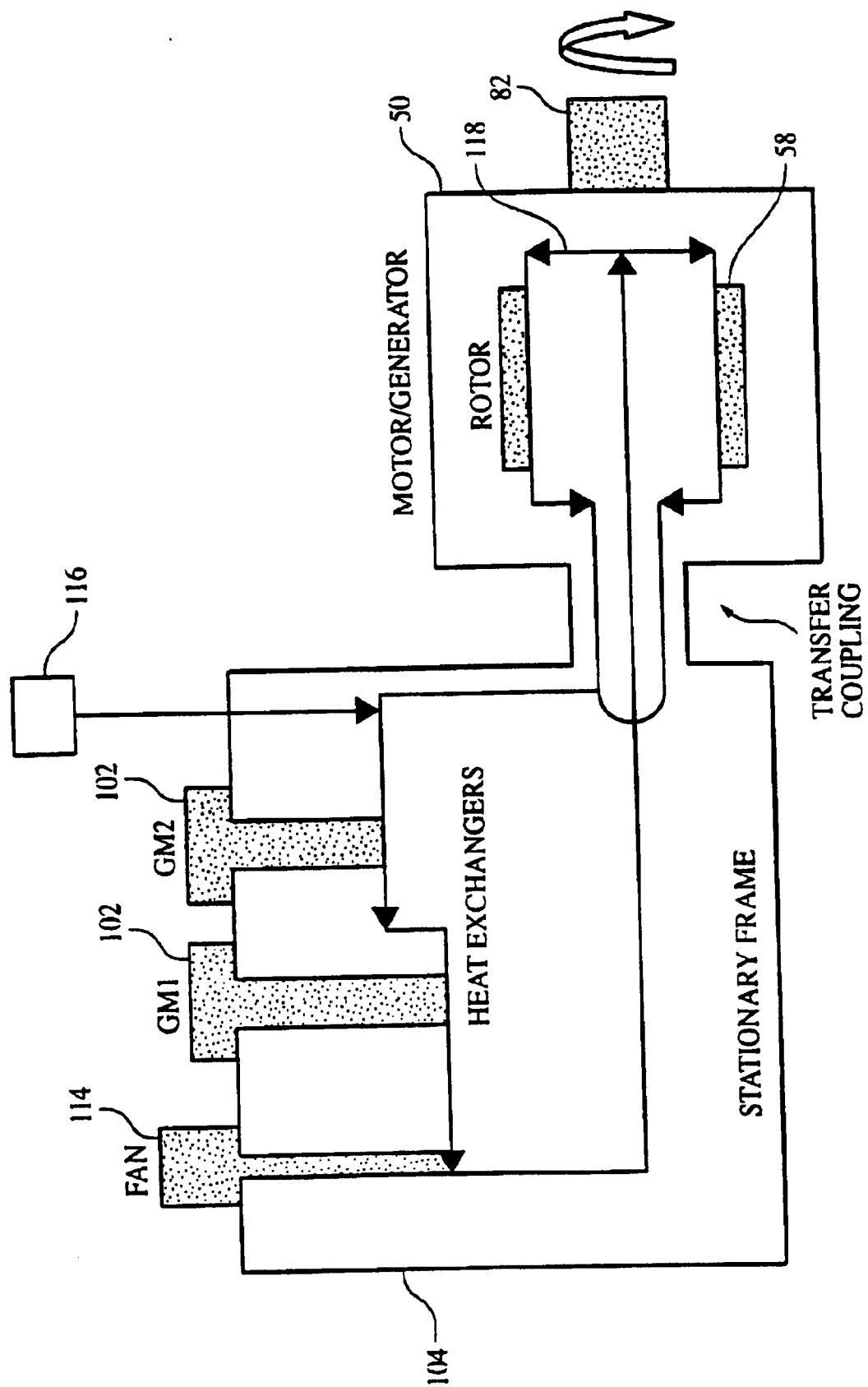
FIG. 15 is a block diagram of a cryogenic cooling system of the superconducting motor of FIG. 1.

Referring to FIGS. 2, 14 and 15, a cryogenic cooling system 100 is used to maintain a cryogenic fluid at cryogenic temperatures and move the cryogenic fluid to and from a cryogenic cooling loop 118 located adjacent and in thermal communication with the rotor coils 52. The cryogenic fluid is moved through the cryogenic cooling loop 118 by a cryogenically adaptable fan 114. This system helps maintain the rotor coils 52 at cryogenic temperatures, because the superconducting rotor coils 52 have to be maintained at cryogenic temperatures (i.e., below −79° C.) to operate properly and efficiently. The cryogenic cooling system 100 includes multiple cryogenically cooled surfaces 102, here Gifford-McMahon cold heads, mounted in cryocooler assemblies 104, a mounting flange 106 and a cryogenically adaptable fan 114. The cryogenic cooling system 100 utilizes a closed loop system for efficiency and ease of maintenance.

The advantage of more than one cryogenically cooled surface 102 is efficiency and ease of maintenance. First, more than one cryogenically cooled surface 102 in series will allow each cryogenically cooled surface 102 to work less to lower the temperature of the cryogenic fluid. Also, if one cryogenically cooled surfaces 102 malfunctions, the redundancy in the system will be able to overcome the loss. Further, if one cryogenically cooled surface 102 does malfunction, the malfunctioning cryogenically cooled surface 102 can be isolated from the system by proper valving, and maintenance performed without shutting down the system or introducing contaminants into the system.

The cryocooler assembly 104 mounts to the outside of the superconducting motor 10 via a mounting flange 106 fixed to the housing 12. The fixed cryocooler assembly 104 is in fluidic communication with a cryogenic cooling loop 118. In an embodiment with a rotating thermal load, such as the rotor coils 52, the cryocooler assembly 104 interfaces with the rotating cryogenic cooling loop 118 by interfacing with a rotary seal 108, here a ferrofluidic rotary seal. The rotary seal 108 allows the cryocooler assembly 104 to remain fixed while the cryogenic cooling loop 118 rotates with the rotor assembly 50. The cryocooler assembly 104 is maintained stationary, rather than rotating, due to undesirable high gravity heat transfer seen internal to the cryocooler assembly 104 if it were to rotate. The cryogenic cooling loop 118 is in thermal communication with the rotor coils 52, maintaining the rotor coils 52 at a cryogenic temperature.

The cryocooler assembly 104 is open to the vacuum chamber 86 of the rotor assembly 50. Keeping the internal area of the cryocooler assembly 104 at vacuum helps to isolate the portion of the cryogenic cooling loop 118 that is located within the cryocooler assembly 104 from outside temperatures. The vacuum isolation further helps improve the efficiency of the cryogenically cooled surfaces 102.

The cryogenic fluid, helium in this embodiment, is introduced into the system from a cryogenic fluid source 116. The cryogenic cooling system is a closed system, but cryogenic fluid will have to be added periodically should any leaks develop. Other cryogenic fluids, such as hydrogen, neon or oxygen, may also be used.

The cryogenic fluid must be moved from the cryocooler 104 to the portion of the cryogenic cooling loop 118 located within the rotor body 58. A cryogenically adaptable fan 114 is employed to physically move the cryogenic fluid. The advantage of a fan is that a fan does not require a heat exchanger to warm the fluid to the temperature of an ambient compressor, is inexpensive and is relatively small. In comparison, a prior art room temperature compressor in conjunction with a heat exchanger is more expensive and is much larger. Further details of the operation of the cryogenic cooling system 100 can be found in U.S. patent application Ser. No. 09/480,396, entitled "Cooling System for HTS Machines," filed on Jan. 11, 2000, assigned to American Superconductor Corporation, assignee of the present invention, and incorporated herein by reference.

As discussed above in conjunction with FIGS. 1 and 3–5, each stator coil 22 is wound into a diamond pattern. In many rotating machine applications, particularly those having air cores, the conductor used to wind the stator coils are Rutherford-type conductors. The Rutherford-type conductor generally includes a number of strands, each of which is transposed so that, over a given length (i.e., a full transposition pitch), the strand occupies the cross-sectional position of every other strand in the conductor. Each strand includes an outer insulative coating, such as enamel. With this arrangement, eddy current heating caused by radial and tangential magnetic fields are significantly reduced. Thus, Rutherford-type conductors are well-suited for use in constructing stator windings.

However, in constructing a Rutherford-type conductor, mechanical fabrication constraints limit the realizable geometry of the conductor. For example, for Rutherford-type cables formed with a substantially rectangular geometry, mechanical fabrication constraints generally limit the aspect ratio of the conductor (width:height) of the conductor to be about 10:1. In certain applications, such as high current applications, it may be necessary to wind more than one Rutherford-type conductor in-hand. For example, winding a coil two-in hand means that two conductors are wound one over the other, thereby increasing the overall cross-sectional area of conductor. Thus, winding a pair of conductors, each having a 10:1 aspect ratio, would form a conductor with roughly a 5:1 aspect ratio.

Figure 16:
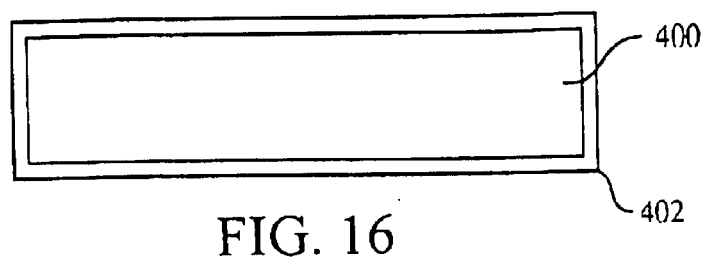
FIG. 16 is a cross-sectional view of a single layer conductor used for winding a stator coil.

Referring to FIG. 16 each single layer of a conductor 400 includes an outer insulation layer 402, for example, a 1–2 mil thick layer of Kapton®, a product of E.I. dupont de Nemours and Company, Wilmington, Del. This outer insulation layer is commonly referred to as the "turn-to-turn" insulation. When winding multiple layers in-hand, the interface between the broad faces of the pair of conductors is occupied by two layers of turn-to-turn insulation. Thus, the ratio of the cross-sectional area of the current-carrying conductor to the overall cross-sectional area of the conductor, referred to as the "packing factor" decreases. Of course, as more single layer conductors are wound in-hand, the smaller the packing factor and the larger the turn-to-turn insulation penalty.

Figure 17:
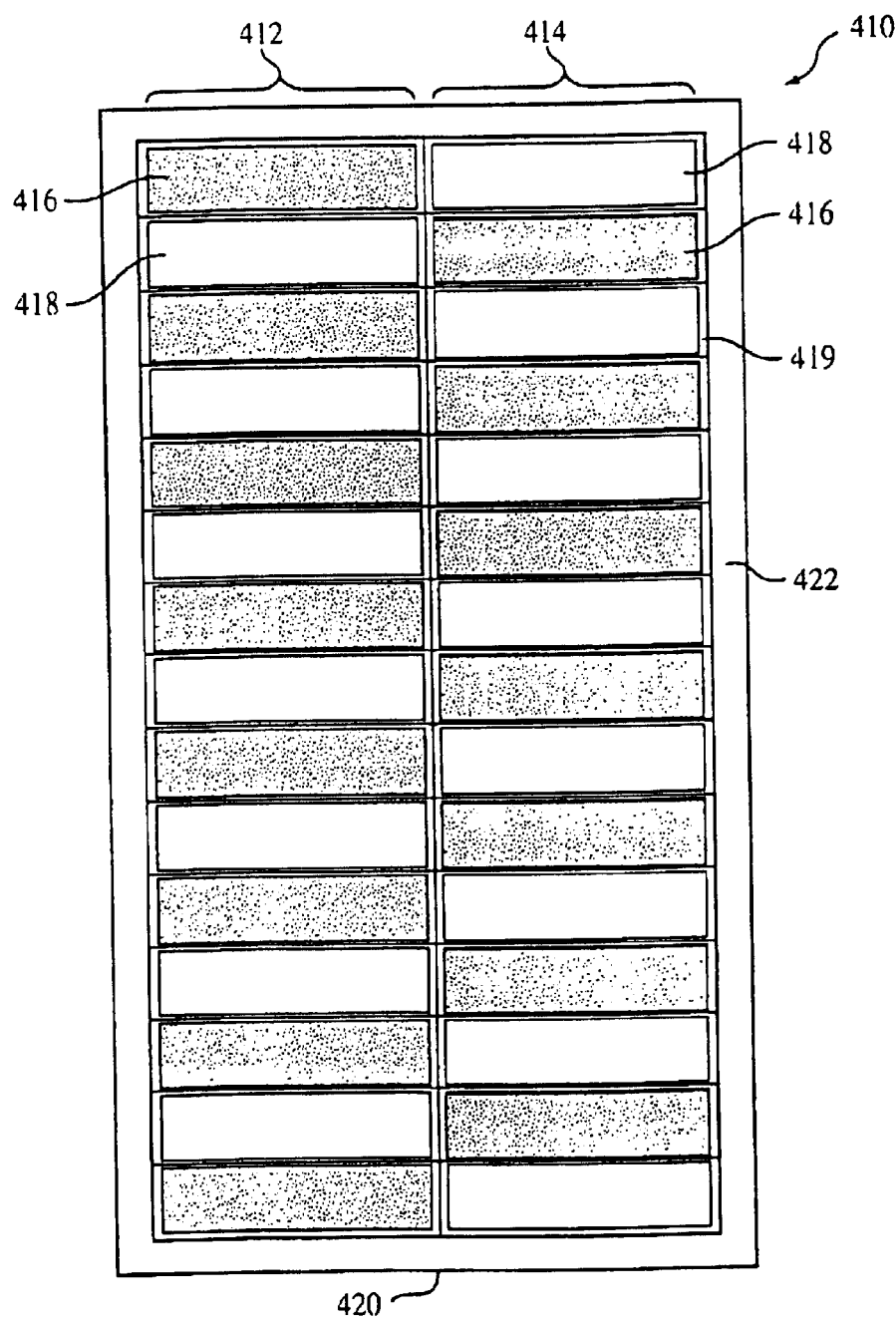
FIG. 17 is a cross-sectional side view of a double pancake coil wound two-in-hand.

Referring to FIG. 17, stator coil 410 includes two pancakes 412, 414, each wound two-in hand. That is, each pancake 412, 414 includes a first conductor 416 and a second conductor 418 wound over the other. It is important to note that the relative positions of the first conductor 416 and second conductor 418 are reversed in pancakes 412, 414. In other words, as shown in FIG. 17, first conductor 416 is above second conductor 418 in pancake 412, while in pancake 414, first conductor 416 is below second conductor 418. The transposition of the first conductor and the second conductor takes place at a base 420 of the coil. One approach for manufacturing the double pancake stator coil 410 is first wind out an appropriate length of first and second conductors 416, 418. Pancake 412 is then wound from the base 420 to the outside diameter so that the ends of conductors 416, 418 are accessible at the outer diameter. Pancake 414, in similar fashion, is then wound from the base to the top of the coil. First and second conductors are electrically isolated from each other using a relatively thin layer of insulation 419 (e.g., 1–2 mil mylar tape) or a layer of Formvar, but are electrically connected at an end region of the diamond-shaped stator coil 22. Ground wall insulation 422 is then applied over the pancakes 412, 414. With this arrangement, voltage induced in the circuits formed by first and second conductors 416, 418 are identical to a first order and any circulating currents between the circuits are minimized, thus reducing overall losses of the coil.

Figure 18:
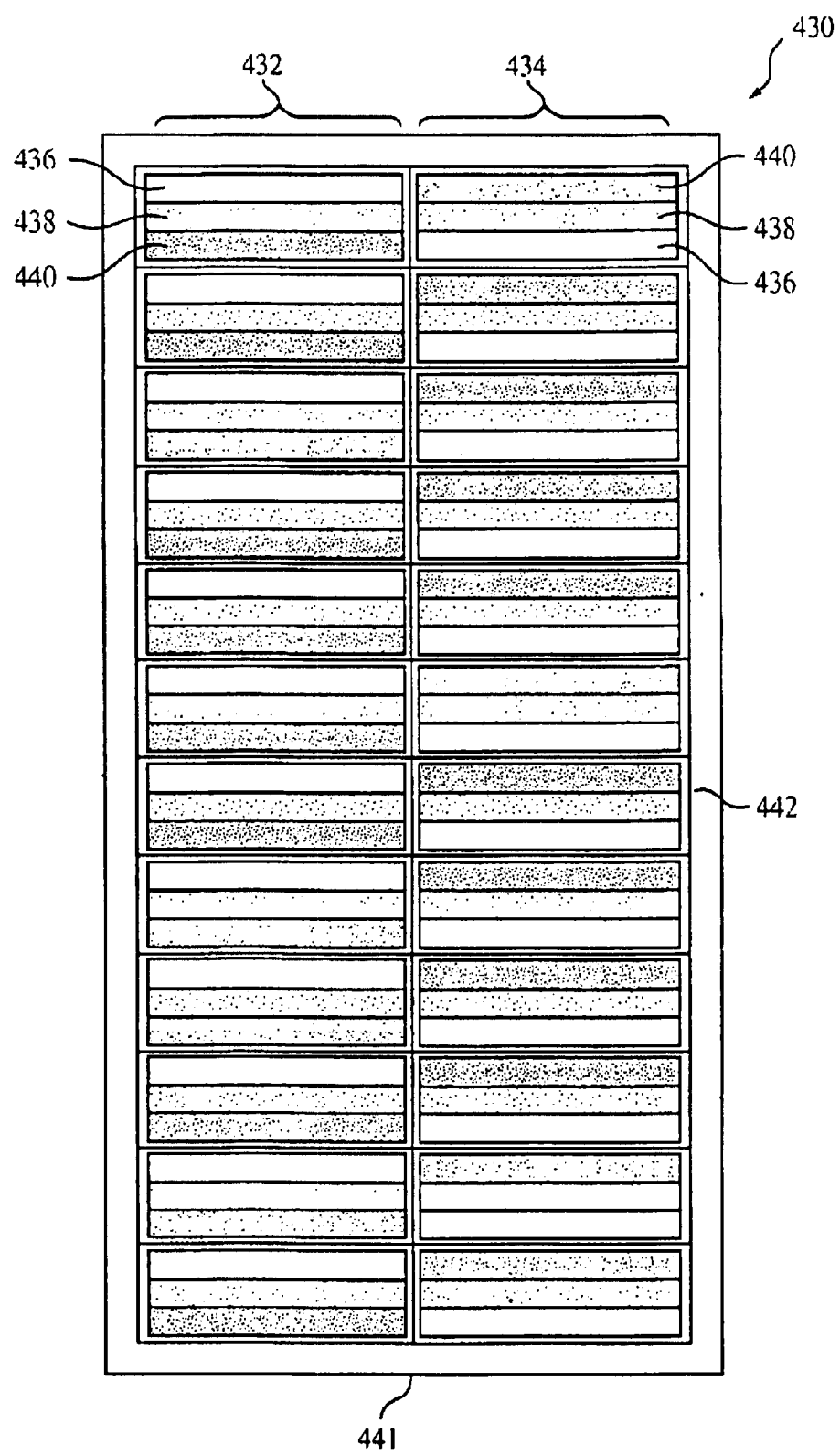
FIG. 18 is a cross-sectional side view of a double pancake coil wound three-in-hand.

Referring to FIG. 18, in another embodiment, a stator coil 430 include two pancakes 432, 434, each wound three-ill hand. As was the case above, each pancake 432, 434 includes a first conductor 436, a second conductor 438, and a third conductor 440 wound over each other. In this three-in hand winding approach, first pancake 432 is formed so that second conductor 438 is sandwiched between the other conductors, with first conductor 436 above the second conductor 438 and third conductor 440 below of the second conductor. Second pancake, 434, however, is wound such that first conductor 436 is below second conductor 438 and third conductor 440 is above the second conductor. The transposition of the first conductor and the third conductor takes place at a base 441 of the coil. All three conductors, 436, 438, 440 are electrically isolated from each other using insulation, but are electrically connected at the end regions of the coil and ground wall insulation 442 is then applied over the pancakes 432, 434.

Diamond-shaped stator coils for use with motor 10 can be formed from either of the two-in hand or three-in hand double pancake coils described above. One approach is to secure end regions of the coils and then the longer sides of the coil are grasped and rolled or twisted under, thereby forming the hairpin end regions of the stator coils. In a variation of this approach, the stator coil can be bent into a saddle form, such as those described in U.S. Ser. No. 09/415,626, filed Oct. 12, 1999, and entitled SUPERCONDUCTING ROTATING MACHINES, which is incorporated herein by reference.

A number of embodiments of the invention have been described. Nevertheless, it will be understood that various modifications may be made without departing from the spirit and scope of the invention. For example, the components described could be adapted to produce other superconducting rotating machines, such as a superconducting generator. Accordingly, other embodiments are within the scope of the following claims.

What is claimed is:

1. A stator for use in a rotating machine, the stator comprising:

a first conductor wound in-hand with a second conductor to form adjacent pancake windings, the positions of the first and second conductors being transposed from one pancake winding to an adjacent pancake winding, the second conductor electrically isolated from the first conductor along the length of the first and second conductors.

2. The stator of claim 1 wherein the first conductor and second conductor are formed of copper.

3. A stator for use in a rotating machine comprising:

a first pancake coil; and a second pancake coil connected to the first pancake coil, each of the first and second pancake coils including a first conductor and a second conductor;

the second conductor wound, in-hand, over the first conductor and electrically isolated from the first conductor along the length of the first and second conductors to form the first pancake coil, the first conductor wound, in-hand over the second conductor to form the second pancake coil.

4. The stator of claim 3 further comprising ground wall insulation disposed over at least one of the pancake coils.

5. The stator of claim 4 wherein the pancake coil are racetrack-shaped.

6. The stator of claim 5 wherein the pancake coil have a saddle form.

7. A method of forming a stator for use in a rotating machine, the method comprising:

forming a first pancake winding by winding, in hand, a second conductor over a first conductor, the second conductor electrically isolated from the first conductor along the length of the first and second conductors, transposing the positions of the first and second conductors:

forming a second pancake winding by winding, in hand, the first conductor over the second conductor; and electrically connecting an end of the first conductor to an end of the second conductor.

8. The method of claim 7 further comprising electrically connecting an end of the first conductor to an end of the second conductor.

9. The method of claim 7 wherein the first conductor and the second conductor are formed of copper.

10. A method of forming a stator for use in a rotating machine, the method comprising:

winding, in hand, a second conductor over a first conductor to form a pancake coil, the second conductor electrically isolated from the first conductor along the length of the first and second conductors;

transposing the position of the first and second conductor; and winding the first conductor over the second conductor to form a second pancake coil.

11. The method of claim 10 further comprising applying ground wall insulation over at least one of the pancake coils.

12. The method of claim 11 comprising forming the pancake coils into a racetrack-shape.

13. The method of claim 12 comprising forming the pancake coils into a saddle form.

* * * * *